US007706318B2

(12) United States Patent
Lee et al.

(10) Patent No.: US 7,706,318 B2
(45) Date of Patent: Apr. 27, 2010

(54) METHOD AND APPARATUS FOR TRANSMITTING AND RECEIVING MBMS PACKET DATA AND CONTROL INFORMATION

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 1324 days.

(21) Appl. No.: 10/923,102

(22) Filed: Aug. 19, 2004

(65) Prior Publication Data

US 2005/0041681 A1    Feb. 24, 2005

(30) Foreign Application Priority Data

Aug. 19, 2003   (KR) .................. 10-2003-0057102

(51) Int. Cl.
*H04B 7/212*   (2006.01)
(52) U.S. Cl. .................. 370/322; 370/442; 455/515
(58) Field of Classification Search .......... 370/312, 370/442, 432, 437, 522, 524, 528; 455/403, 455/434, 515
See application file for complete search history.

(56) References Cited

U.S. PATENT DOCUMENTS

| 6,075,981 | A  | * | 6/2000 | Shah et al. ............... 455/403 |
| 6,594,252 | B1 | * | 7/2003 | Barany et al. ............ 370/347 |
| 7,245,601 | B2 | * | 7/2007 | Jeschke et al. ........... 370/335 |

| 2003/0088695 | A1 |   | 5/2003 | Kwak et al. |
| 2004/0047425 | A1 | * | 3/2004 | Itoh .......................... 375/259 |
| 2004/0105402 | A1 | * | 6/2004 | Yi et al. .................... 370/312 |

FOREIGN PATENT DOCUMENTS

| EP | 0831669 | 9/1997 |
| EP | 1 104 212 A2 | 5/2001 |
| KR | 10-2002-0072163 | 9/2002 |
| KR | 10-2002-0072505 | 9/2002 |
| KR | 10-2003-0031307 | 4/2003 |
| KR | 10-2003-0037948 | 5/2003 |
| KR | 10-2003-0038128 | 5/2003 |
| RU | 2117395 | 8/1998 |
| RU | 2175466 | 7/2000 |

\* cited by examiner

*Primary Examiner*—Kevin C Harper
*Assistant Examiner*—Henry Baron
(74) *Attorney, Agent, or Firm*—Lee, Hong, Degerman, Kang & Waimey

(57) ABSTRACT

A method and apparatus is provided that enables a mobile terminal which cannot simultaneously receive two physical channels to receive a service that utilizes two physical channels. In one embodiment, the service data and control information are transmitted on separate physical channels in a non-simultaneous manner such that the physical channel on which the data is transmitted includes an indication of when control information is available on the other physical channel on which the control information is transmitted, thereby facilitating the mobile terminal switching between the two physical channels in order to receive the service data and control information. In another embodiment, the service data and control information are transmitted on a single physical channel, thereby precluding the need for the mobile terminal to switch between two physical channels in order to receive the service data and control information.

11 Claims, 17 Drawing Sheets

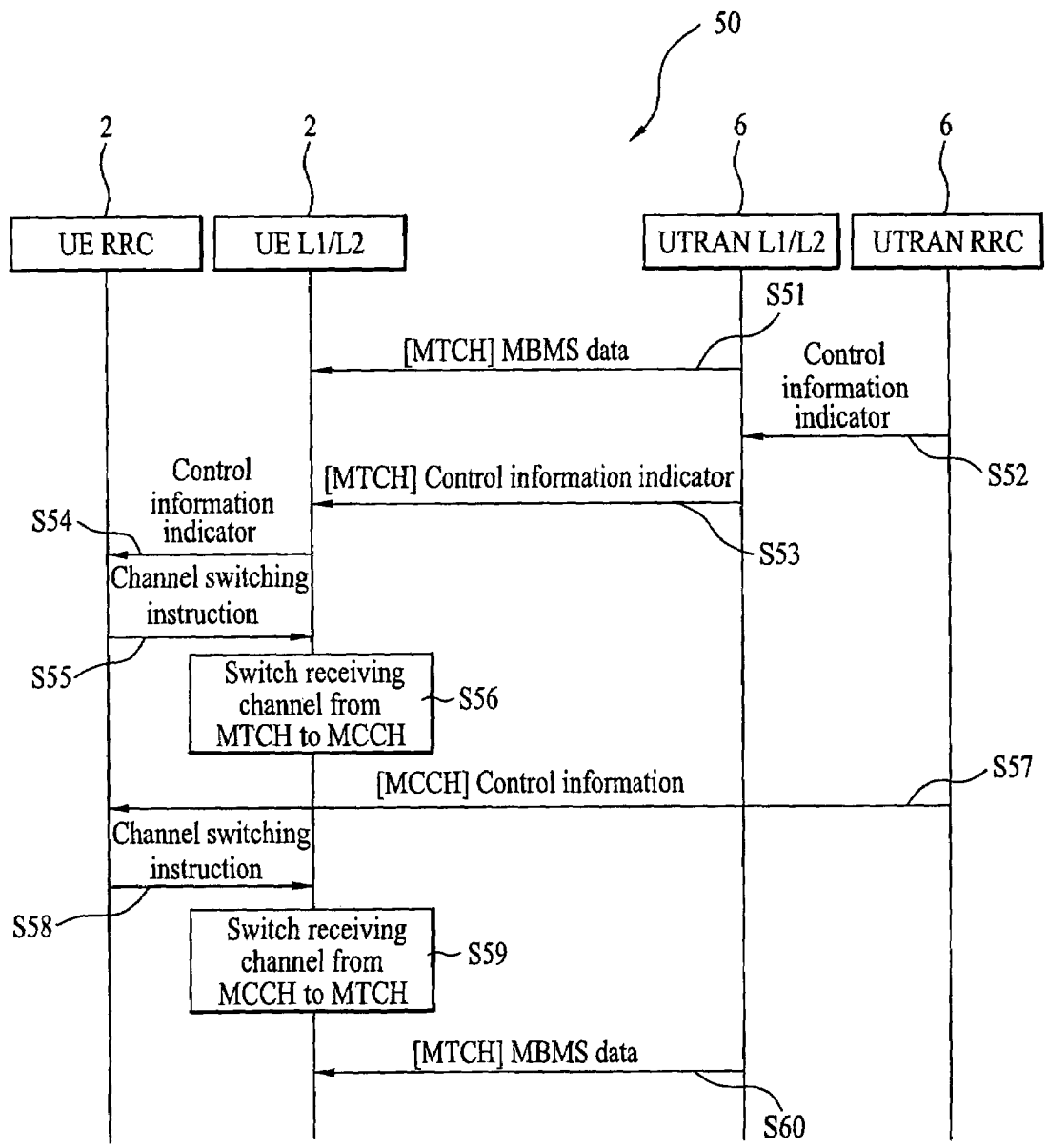

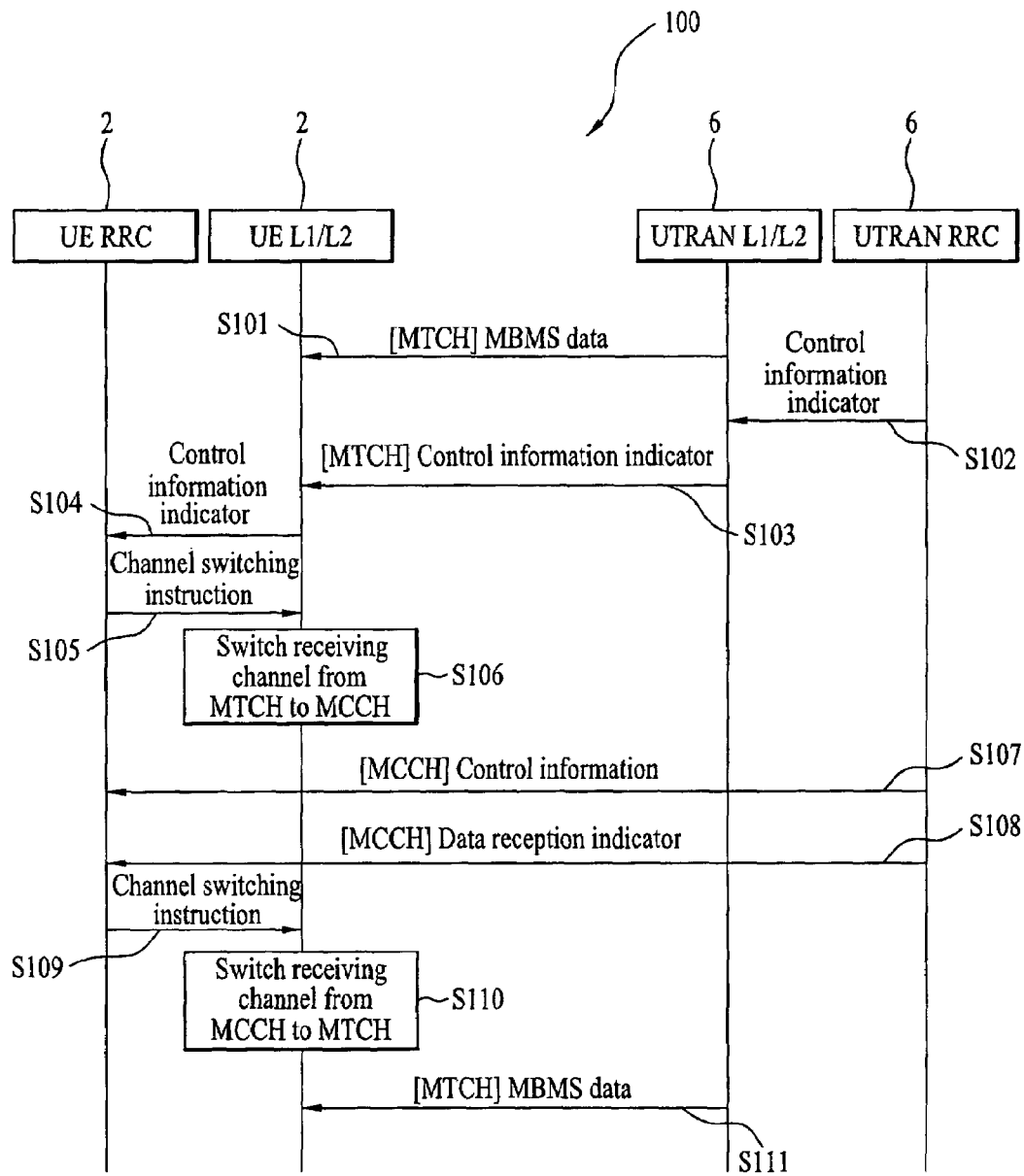

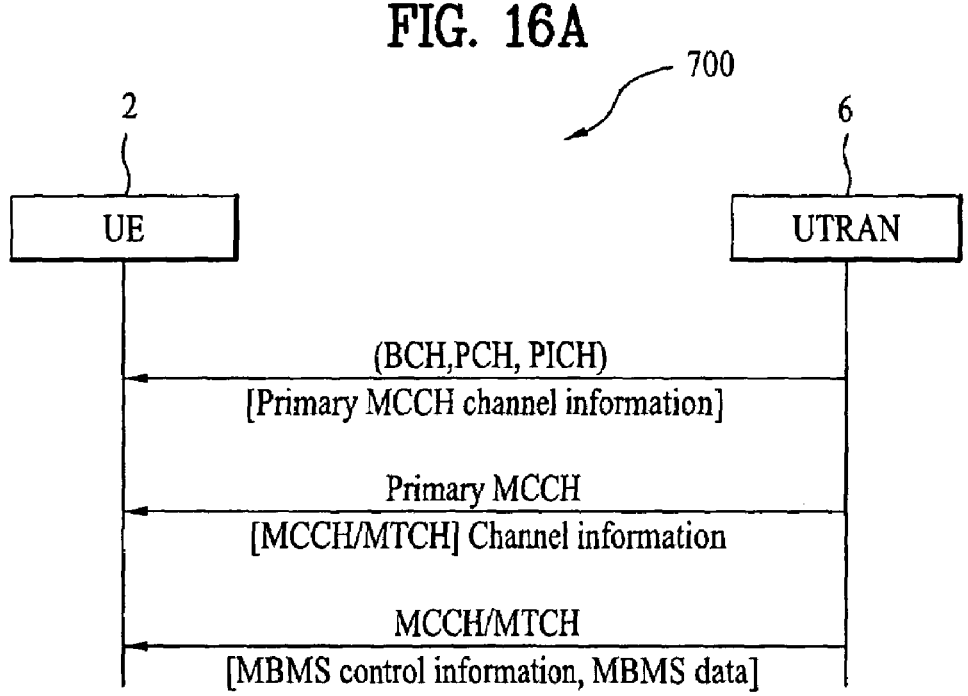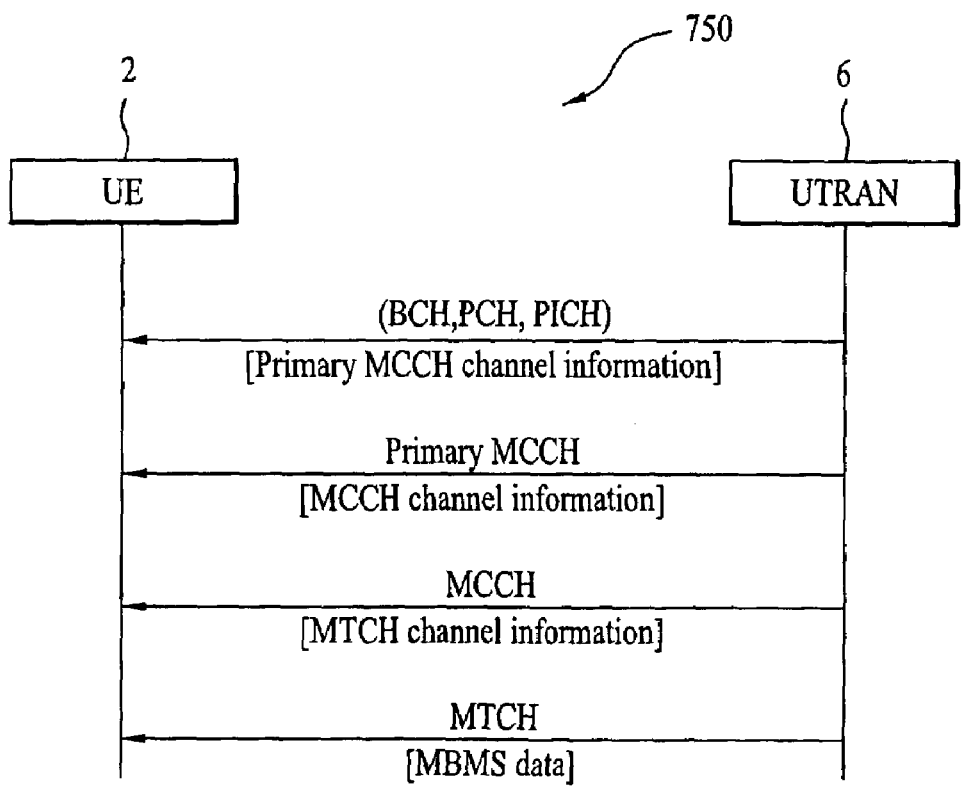

METHOD AND APPARATUS FOR TRANSMITTING AND RECEIVING MBMS PACKET DATA AND CONTROL INFORMATION

CROSS-REFERENCE TO RELATED APPLICATIONS

This application claims the benefit of Korean Application No. 10-2003-0057102 filed on Aug. 19, 2003, which is hereby incorporated by reference.

BACKGROUND OF THE INVENTION

1. Field of the Invention

The present invention relates to packet data services provided in communication systems, and more particularly, to a method and apparatus for transmitting and receiving service packet data and associated control information to and from a mobile terminal by utilizing disparate physical channels for receiving the packet data and the associated control information.

2. Discussion of the Related Art

The universal mobile telecommunications system (UMTS) is a third-generation mobile communications system evolving from the global system for mobile communications system, which is the European standard. The UMTS is aimed at providing enhanced mobile communications services based on the GSM core network and wideband code-division multiple-access technologies.

A conventional UMTS network structure 1 is illustrated in FIG. 1. One mobile terminal 2, or user equipment (UE), is connected to a core network 4 through a UMTS terrestrial radio access network (UTRAN) 6. The UTRAN 6 configures, maintains, and manages a radio access bearer for communications between the UE 2 and core network 4 to meet end-to-end quality-of-service requirements.

The UTRAN 6 includes a plurality of radio network subsystems 8, each of which comprises one radio network controller (RNC) 10 for a plurality of base stations 12, or "Node Bs." The RNC 10 connected to a given base station 12 is the controlling RNC for allocating and managing the common resources provided for any number of UEs 2 operating in one cell. The controlling RNC 10 controls traffic load, cell congestion, and the acceptance of new radio links. Each Node B 12 may receive an uplink signal from a UE 2 and may transmit downlink signals to the UE. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer of the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and UTRAN 6 is realized through a radio interface protocol established in accordance with 3GPP radio access network specifications describing a physical layer (L1), a data link layer (L2), and a network layer (L3). A control plane is provided for carrying control information for the maintenance and management of the interface and a user plane is provided for carrying data traffic such as voice signals and Internet protocol packet transmissions. The conventional architecture of the radio interface protocol is illustrated in FIG. 2.

The physical (PHY) layer provides information transfer service to a higher layer and is linked via transport channels to a medium access control (MAC) layer. The MAC layer includes a MAC-b entity, a MAC-d entity, and a MAC-c/sh entity.

The MAC-b entity manages the broadcast channel as a transport channel responsible for the broadcasting of system information. The MAC-c/sh entity manages common transport channels shared with other UEs 2 within the cell, for example the forward access channel and downlink shared channel, such that one MAC-c/sh entity exists for each cell and is located at the serving RNC 10. Therefore, each UE 2 has one MAC-c/sh entity. The MAC-d entity manages a dedicated transport channel with respect to a specific UE 2 such that the MAC-d entity is located at the serving RNC 10 and each UE also has one MAC-d entity.

A radio link control (RLC) layer supports the transmission of reliable data and is responsible for the segmentation and concatenation of RLC service data units delivered from a higher layer. The size of the RLC service data unit is adjusted for the processing capacity in the RLC layer and a header is appended to form an RLC protocol data unit for delivery to the MAC layer.

The formed units of service data and protocol data delivered from the higher layer are stored in an RLC buffer of the RLC layer. The RLC services are used by service-specific protocol layers on the user plane, namely a broadcast/multicast control (BMC) protocol and a packet data convergence protocol (PDCP), and are used by a radio resource control (RRC) layer for signaling transport on the control plane.

The BMC layer schedules a cell broadcast message delivered from the core network and enables the cell broadcast message to be broadcast to the corresponding UEs 2 in the appropriate cell. Header information, such as a message identification, a serial number, and a coding scheme, is added to the cell broadcast message to generate a broadcast/multicast control message for delivery to the RLC layer.

The RLC layer appends RLC header information and transmits the thus-formed message to the MAC layer via a common traffic channel as a logical channel. The MAC layer maps the common traffic channel to a forward access channel as a transport channel. The transport channel is mapped to a secondary common control physical channel as a physical channel.

The PDCP layer serves to transfer data efficiently over a radio interface having a relatively small bandwidth. The PDCP layer uses a network protocol such as IPv4 or IPv6 and a header compression technique for eliminating unnecessary control information utilized in a wire network. The PDCP layer enhances transmission efficiency since only the information essential to the header is included in the transfer.

The RRC layer handles the control plane signaling of the network layer (L3) between the UEs 2 and the UTRAN 6 and controls the transport and physical channels for the establishment, reconfiguration, and release of radio bearers. A radio bearer is a service provided by a lower layer, such as the RLC layer or MAC layer, for data transfer between the UE 2 and UTRAN 6.

Establishment of a radio bearer determines the regulating characteristics of the protocol layer and channel needed to provide a specific service, thereby establishing the parameters and operational methods of the service. When a connection is established to allow transmission between an RRC layer of a specific UE 2 and an RRC layer of the UTRAN 6, the UE is said to be in the RRC-connected state. Without such connection, the UE 2 is in an idle state.

In addition to the above-described entities of the MAC layer, a MAC-m entity is provided to support the user-plane and control-plane transmissions for point-to-multipoint services, for example a multimedia broadcast/multicast service (MBMS), and to handle the scheduling of MBMS-related transport channels. An MBMS is a streaming or background service provided to a plurality of UEs 2 using a downlink-dedicated MBMS radio bearer that utilizes both point-to-multipoint and point-to-point radio bearer services.

As the name implies, an MBMS may be carried out in a broadcast mode or a multicast mode. The broadcast mode is for transmitting multimedia data to all UEs 2 within a broadcast area, for example the domain where the broadcast service is available. The multicast mode is for transmitting multimedia data to a specific UE 2 group within a multicast area, for example the domain where the multicast service is available.

When a UMTS network 1 provides a specific MBMS using the multicast mode, UEs 2 to be provided with the service must first complete a subscription procedure establishing a relationship between a service provider and each UE individually. Thereafter, the subscriber UE 2 receives a service announcement from the core network 4 confirming subscription and including, for example, a list of services to be provided.

The subscriber UE 2 must "join," or participate in, a multicast group of UEs receiving the specific MBMS, thereby notifying the network 4 of its intention to receive the service. Terminating participation in the service is called "leaving." The subscription, joining, and leaving operations may be performed by each UE 2 at any time prior to, during, or after the data transfer.

While a specific MBMS is in progress, one or more service sessions may sequentially take place, and the core network 4 informs the RNC 10 of a session start when data is generated by an MBMS data source and informs the RNC of a session stop when the data transfer is aborted. Therefore, a data transfer for the specific MBMS may be performed for the time between the session start and the session stop, during which time only participating UEs 2 can receive the data.

To achieve successful data transfer, the UTRAN 6 receives a notification of the session start from the core network 4 and transmits an MBMS notification to the participating UEs 2 in a prescribed cell to indicate that the data transfer is imminent. The UTRAN 6 uses the MBMS notification to count the number of participating UEs 2 within the prescribed cell.

Through the counting process, it is determined whether the radio bearer providing the specific MBMS is one for a point-to-multipoint transmission or a point-to-point transmission. To select the MBMS radio bearer for a specific service, the UTRAN 6 sets a threshold corresponding to the UE 2 count, whereby a low UE count establishes a point-to-point MBMS radio bearer and a high UE count establishes a point-to-multipoint MBMS radio bearer.

The radio bearer determination is based on whether the participating UEs 2 need to be in the RRC-connected state. When a point-to-point radio bearer is established, all of the participating UEs 2 are in the RRC-connected state. When a point-to-multipoint radio bearer is established, it is unnecessary for all of the participating UEs 2 to be in the RRC-connected mode since the point-to-multipoint radio bearer enables reception by UEs in the idle state.

Referring now to FIG. 3, the conventional architecture of an MBMS-supported MAC layer is illustrated. A MAC-c/sh/m entity supports two logical channels, specifically the MBMS control channel (MCCH) and the MBMS traffic channel (MTCH).

One MCCH channel exists in each cell and one MTCH channel exists for each specific MBMS within a specific cell. Both logical channels are mapped to a transport channel, such as the forward access channel (FACH), and to a physical channel, such as the secondary control physical channel (SC-CPCH).

An example of conventional logical channel mapping is illustrated in FIG. 4A. FIG. 4A illustrates a mapping structure of the logical channels MTCH and MCCH, whereby the logical channels are respectively mapped to different physical channels, for example to first and second physical channels SCCPCH 1 and SCCPCH 2.

FIG. 4B shows an example of conventional transmission of MBMS data for a specific MBMS and the control information associated with the service. As illustrated in FIG. 4B, logical channel MCCH is a point-to-multipoint downlink channel for transferring MBMS control plane information and logical channel MTCH is a point-to-multipoint downlink channel for transferring MBMS user plane information.

Since the logical channels MCCH and MTCH are each mapped to a unique physical channel, an MBMS-supportable UE 2 must simultaneously receive two physical channels in order to receive the service. There is simultaneous transmission of user information and control information, for example the MBMS data over the MTCH channel and the MBMS control information over the MCCH channel.

However, a UE 2 may be unable to support the simultaneous reception of two different physical channels. Therefore, the UE 2 may be unable to receive either the MBMS data or the MBMS control information.

Even assuming a UE 2 that supports simultaneous reception of two different physical channels, the UE may actually need to receive three or more physical channels simultaneously if the reception of a service in addition to the MBMS is desired. Therefore, the requirement for simultaneous reception of the two logical channels, MCCH and MTCH, hinders enhanced UE 2 operation.

Therefore, there is a need for a method and apparatus for enabling a mobile terminal not having the capability to simultaneously receive two different physical channels to receive a service that is transmitted using at least two logical channels. The present invention addresses these and other needs.

SUMMARY OF THE INVENTION

The present invention is directed to a method and apparatus for transmitting and receiving service packet data and control information to and from a mobile terminal by utilizing disparate physical channels for receiving the packet data and the associated control information. Specifically, the invention is directed to a method and apparatus that enables a mobile terminal which cannot simultaneously receive two physical channels to receive a service that utilizes two physical channels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and apparatus that provides service data and control information such that a mobile terminal need not simultaneously process the information sent on two physical channels. In one embodiment, the service data and control information are transmitted on separate physical channels in a non-simultaneous manner such that the physical channel on which the data is transmitted includes an indication of when control information is available on the other physical channel on which the control information is transmitted, thereby facilitating the mobile terminal switching between the two physical channels in order to receive the service data and control information. In another embodiment, the service data and control information are transmitted on a single physical channel, thereby precluding the need for the mobile terminal to switch between two physical channels in order to receive the service data and control information.

In one aspect of the present invention, a method of receiving a service in a mobile terminal is provided. The method includes receiving data and a control information indicator via a first channel and receiving control information via a second channel according to the control information indicator.

The data received on the first channel is associated with the service that is being provided to the mobile terminal and the control information indicator received on the first channel indicates the transmission of control information on the second channel. The control information received on the second channel is associated with the service being provided to the mobile terminal and/or another service that the mobile terminal may desire to receive. By receiving an indication that control information is transmitted on the second channel, the mobile terminal need not receive the first and second channel simultaneously, thereby allowing the mobile terminal to receive the data on the first channel at one period in time and receive the control information on the second channel at another period in time.

It is contemplated that the service may be a point-to-multipoint service, for example a multimedia broadcast/multicast service (MBMS). It is further contemplated that the data may be point-to-multipoint data and the control information may be point-to-multipoint control information. Moreover, it is contemplated that the data and control information are not received simultaneously.

The mobile terminal may utilize the control information indicator received on the first channel to determine when to switch from the first channel, on which the data was received, to the second channel to receive the control information. Switching back from the second channel to the first channel in order to again receive data may be performed upon receiving the control information on the second channel. On the other hand, an indication that data is transmitted on the first channel may be received on the second channel. The mobile terminal may not switch back from the second channel immediately upon receiving the control information, but rather switch back upon receiving the indication that data is transmitted on the first channel.

Preferably, the first channel and second channel are physical channels. Various combinations of logical channel mapping are also contemplated.

The data and control information indicator may originate from the same first logical channel and the control information may originate from a second logical channel. Upon receipt, the data and control information indicator are mapped to the same first logical channel and the control information is mapped to a second logical channel. For example, the data and control information indicator may be mapped to an MTCH logical channel and the control information may be mapped to an MCCH logical channel.

The data, control information indicator and control information may originate from different logical channels. Upon receipt, the data is mapped to a first logical channel, the control information indicator is mapped to a second logical channel and the control information is mapped to a third logical channel. For example, the data may be mapped to an MTCH logical channel, the control information indicator may be mapped to a secondary MCCH logical channel and the control information may be mapped to a primary MCCH logical channel.

In another aspect of the present invention, a method of receiving a service in a mobile terminal is provided. The method includes receiving data and a control information indicator via a first channel, determining whether to receive the control information on the second channel based on the control information indicator and either switching to the second channel to receive the control information or not switching to the second channel.

It is contemplated that switching from the first channel to the second channel is performed if the control information indicator indicates that the mobile terminal is to receive the control information. It is further contemplated that switching from the first channel to the second channel is performed if the mobile terminal has joined the service.

It is contemplated that the service may be a point-to-multipoint service, for example a multimedia broadcast/multicast service (MBMS). It is further contemplated that the data may be point-to-multipoint data and the control information may be point-to-multipoint control information. Moreover, it is contemplated that the data and control information are not received simultaneously.

In another aspect of the present invention, a method of receiving a service in a mobile terminal is provided. The method includes receiving first control information on a first point-to-multipoint channel, establishing a second point-to-multipoint channel and receiving data and second control information on the second point-to-multipoint channel.

The first control information is associated with the service and/or another service that the mobile terminal may desire to receive. The data is associated with the service. The second control information is associated with the service and/or another service that the mobile terminal may desire to receive. The first and second point-to-multipoint channels are associated with the service.

Preferably, the first control information is related to information on the second point-to-multipoint channel and the data and second control information are received in accordance with the first control information. It is contemplated that the second control information may indicate that the mobile terminal has joined the service. It is further contemplated that the service may be a point-to-multipoint service, for example a multimedia broadcast/multicast service (MBMS).

Receiving the first control information may include establishing a primary MCCH logical channel. In order to establish the primary MCCH logical channel, a broadcast channel such as BCH, a paging channel such as PCH or a page indicator channel such as PICH may be received. A secondary MCCH channel may be established based on the information received on the primary MCCH channel.

Preferably, the first point-to-multipoint channel and second point-to-multipoint channel are physical channels, for example a primary SCCPCH channel and a second SCCPCH channel. Various combinations of logical channel mapping are also contemplated.

The data and second control information may originate from the same logical channel. Upon receipt, the data and second control information are mapped to the same logical channel. The data and second control information may originate from different logical channels. Upon receipt, the data is mapped to a first logical channel and the second control information is mapped to a second logical channel. For example, the data may be mapped to an MTCH logical channel and the second control information may be mapped to a secondary MCCH logical channel.

The data may originate from two different logical channels. Upon receipt, the data is mapped to a first logical channel and a third logical channel. For example, the data may be mapped to a primary MTCH logical channel and a secondary MTCH logical channel.

In another aspect of the present invention, a method of providing a service to a mobile terminal is provided. The method includes transmitting data and a control information indicator via a first channel and transmitting control information via a second channel according to the control information indicator.

The data transmitted on the first channel is associated with the service that is being provided to the mobile terminal and the control information indicator transmitted on the first channel indicates the transmission of control information on the second channel. The control information transmitted on the second channel is associated with the service being provided to the mobile terminal and/or another service that the mobile terminal may desire to receive. By providing an indication that control information is transmitted on the second channel, the mobile terminal need not receive the first and second channel simultaneously, thereby allowing the mobile terminal to receive the data on the first channel at one period in time and receive the control information on the second channel at another period in time.

It is contemplated that the service may be a point-to-multipoint service, for example a multimedia broadcast/multicast service (MBMS). It is further contemplated that the data may be point-to-multipoint data and the control information may be point-to-multipoint control information. Moreover, it is contemplated that the data and control information are not transmitted simultaneously.

The mobile terminal may utilize the control information indicator transmitted on the first channel to determine when to switch from the first channel, on which the data was transmitted, to the second channel to receive the control information. An indication that data is transmitted on the first channel may be transmitted on the second channel. The mobile terminal may not switch back from the second channel immediately upon receiving the control information, but rather switch back upon receiving the indication that data is transmitted on the first channel.

Preferably, the first channel and second channel are physical channels. Various combinations of logical channel mapping are also contemplated.

The data and control information indicator may originate from the same first logical channel and the control information may originate from a second logical channel. For example, the data and control information indicator may be mapped from an MTCH logical channel and the control information may be mapped from an MCCH logical channel.

The data, control information indicator and control information may originate from different logical channels. For example, the data may be mapped from an MTCH logical channel, the control information indicator may be mapped from a secondary MCCH logical channel and the control information may be mapped from a primary MCCH logical channel.

In another aspect of the present invention, a method of providing a service in a mobile terminal is provided. The method includes transmitting first control information on a first point-to-multipoint channel and transmitting data and second control information on a second point-to-multipoint channel once the second point-to-multipoint channel has been established by the mobile terminal The first control information is associated with the service and/or another service that the mobile terminal may desire to receive. The data is associated with the service. The second control information is associated with the service and/or another service that the mobile terminal may desire to receive. The first and second point-to-multipoint channels are associated with the service.

Preferably, the first control information is related to information on the second point-to-multipoint channel. It is contemplated that the second control information may indicate that the mobile terminal has joined the service. It is further contemplated that the service may be a point-to-multipoint service, for example a multimedia broadcast/multicast service (MBMS).

Preferably, the first point-to-multipoint channel and second point-to-multipoint channel are physical channels, for example a primary SCCPCH channel and a second SCCPCH channel. Various combinations of logical channel mapping are also contemplated.

The data and second control information may originate from the same logical channel. The data and second control information may originate from different logical channels. For example, the data may be mapped from an MTCH logical channel and the second control information may be mapped from a secondary MCCH logical channel.

The data may originate from two different logical channels. For example, the data may be mapped from a primary MTCH logical channel and a secondary MTCH logical channel.

In another aspect of the present invention, a network is provided for providing a service to a mobile terminal. The network includes a transmitter, a receiver, and a controller. The transmitter transmits data and control information to the mobile terminal via a first channel and a second channel. The receiver receives information from the mobile terminal and a core network. The controller performs the methods of the present invention to provide data and a control information indicator on the first channel, the data associated with the service and the control information indicator indicating the transmission of control information on the second channel, and to provide control information on the second channel, the control information associated with the service and/or another service that the mobile terminal may desire to receive.

In another aspect of the present invention, a network is provided for providing a service to a mobile terminal. The network includes a transmitter, a receiver, and a controller. The transmitter transmits data and control information to the mobile terminal via a first point-to-multipoint channel and a second point-to-multipoint channel. The receiver receives control information from the mobile terminal and a core network. The controller performs the methods of the present invention to provide first control information on the first point-to-multipoint channel, the first control information associated with the service and/or another service that the mobile terminal may desire to receive, and to provide data and second control information on the second point-to-multipoint channel once the second point-to-multipoint channel is established, the data associated with the service and the second control information associated with the service and/or another service that the mobile terminal may desire to receive.

In another aspect of the present invention, a mobile communication device is provided for receiving a service from a network. The mobile communication device includes an RF module, an antenna, a keypad, a display, a storage unit, and a processing unit.

The antenna and RF module receive data and a control information indicator via first channel and control information via a second channel. The keypad allows a user to enter information. The display conveys information to a user. The storage unit stores data and control information. The processing unit performs the methods of the present invention to process the data and control information indicator received on the first channel, the data associated with the service and the control information indicator associated with the service and/or another service that the mobile terminal may desire to receive, in order to receive and process the control information on the second channel, the control information associated with the service and/or another service that the mobile terminal may desire to receive.

In another aspect of the present invention, a mobile communication device is provided for receiving a service from a network. The mobile communication device includes an RF module, an antenna, a keypad, a display, a storage unit, and a processing unit.

The antenna and RF module receive first control information via a first point-to-multipoint channel and data and second control information via a second point-to-multipoint channel. The keypad allows a user to enter information. The display conveys information to a user. The storage unit stores the first control information, the data and the second control information. The processing unit performs the methods of the present invention process the first control information received on the first point-to-multipoint channel, the first control information associated with the service and/or another service that the mobile terminal may desire to receive, in order to receive and process the data and second control information on the second point-to-multipoint channel, the data associated with the service and the second control information associated with the service and/or another service that the mobile terminal may desire to receive.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates a method for transmitting and receiving MBMS-associated data and control information according to FIG. 5.

FIG. 8 illustrates a method for transmitting and receiving MBMS-associated data and control information according to FIG. 7.

FIG. 16A and FIG. 16B illustrate respective methods for establishing the MCCH channel according to the fifth embodiment of the present invention.

DETAILED DESCRIPTION OF THE PREFERRED EMBODIMENTS

The present invention relates to a method and apparatus for transmitting and receiving service packet data and control information to and from a mobile terminal by utilizing disparate physical channels for receiving the packet data and the associated control information such that a mobile terminal which cannot simultaneously receive two physical channels is able to receive a service that utilizes two physical channels. Although the present invention is illustrated with respect to a mobile terminal, it is contemplated that the present invention may be utilized anytime it is desired to provide a service that utilizes two physical channels to a mobile communication device that cannot simultaneously receive two physical channels.

Reference will now be made in detail to the preferred embodiments of the present invention, examples of which are illustrated in the accompanying drawings. Throughout the drawings, like elements are indicated using the same or similar reference designations.

First Embodiment

Figure 1:
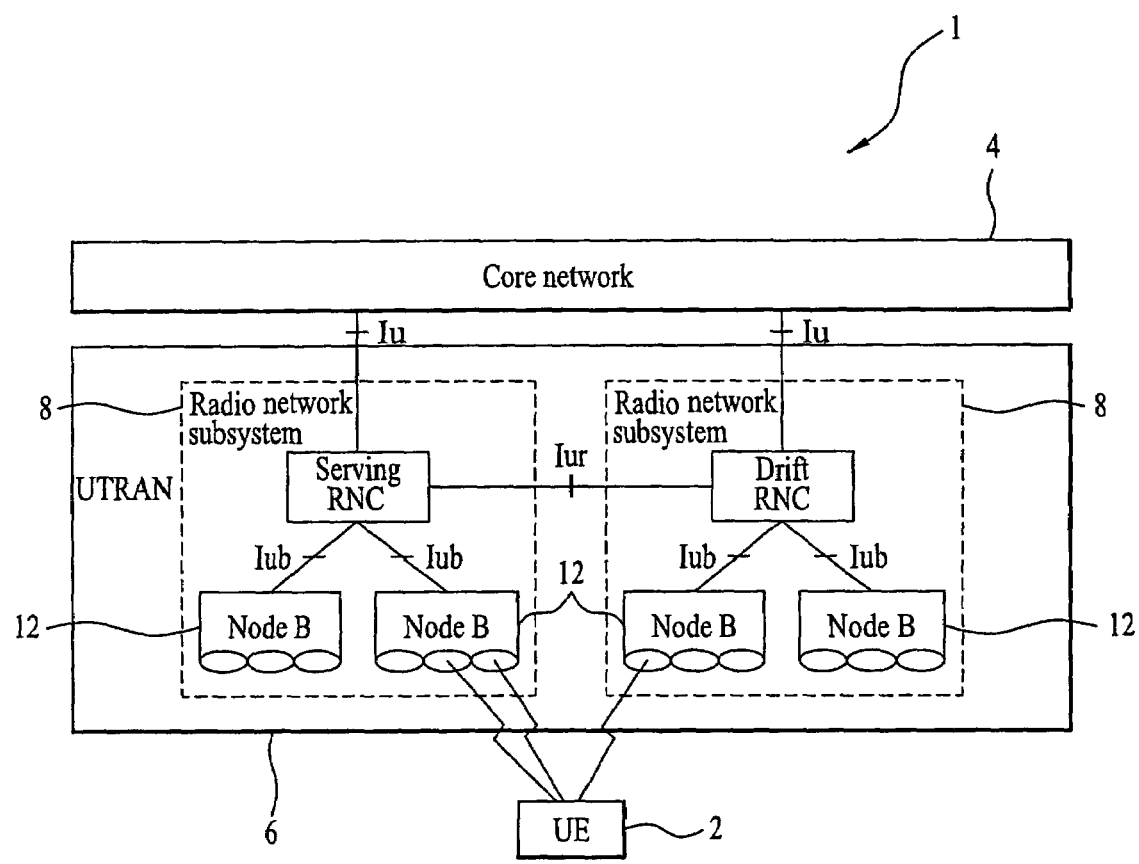
FIG. 1 illustrates a block diagram of a conventional UMTS network structure.
Figure 2:
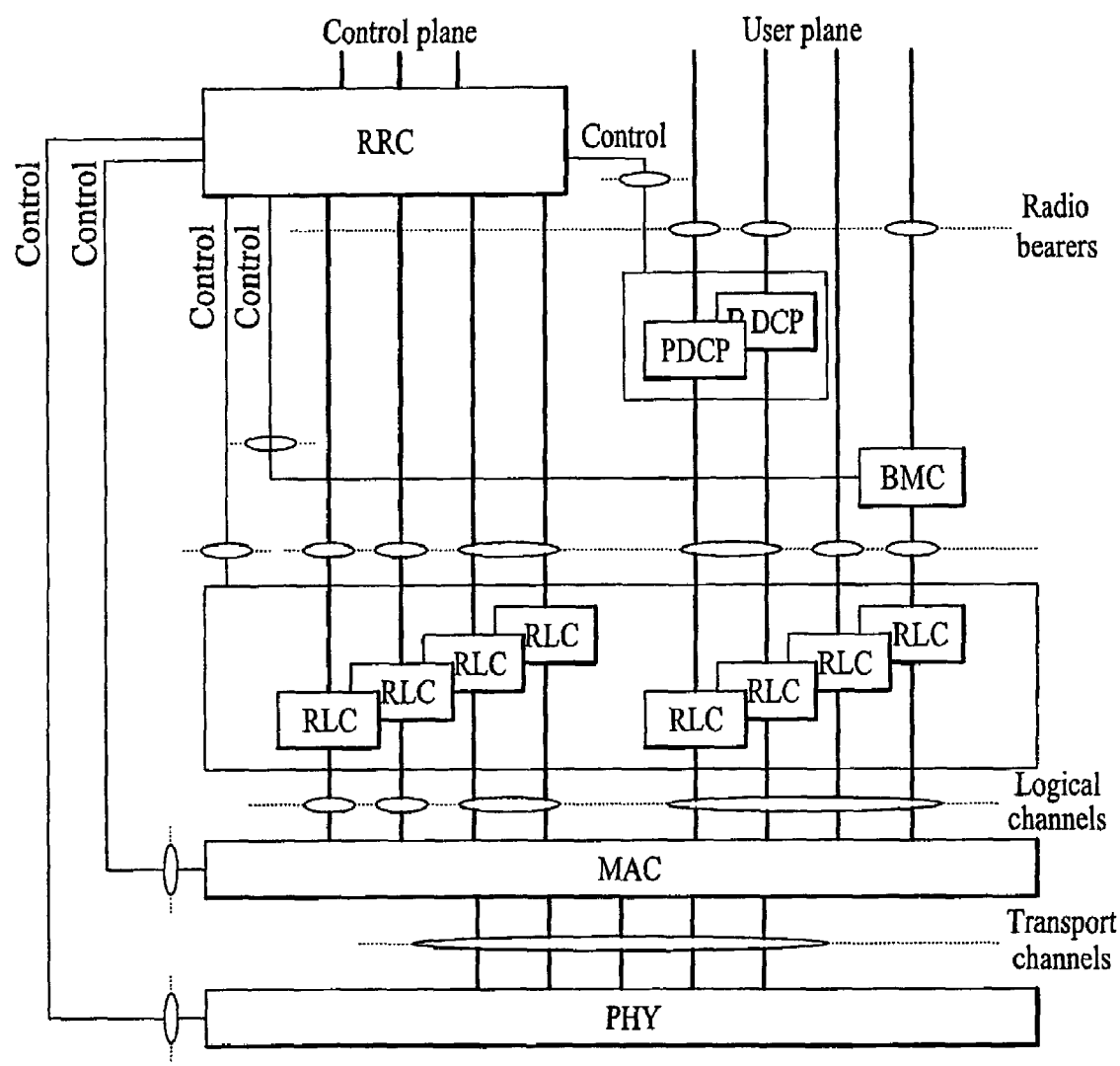
FIG. 2 illustrates a block diagram of the architecture of a conventional radio interface protocol based on 3GPP radio access network specifications.
Figure 3:
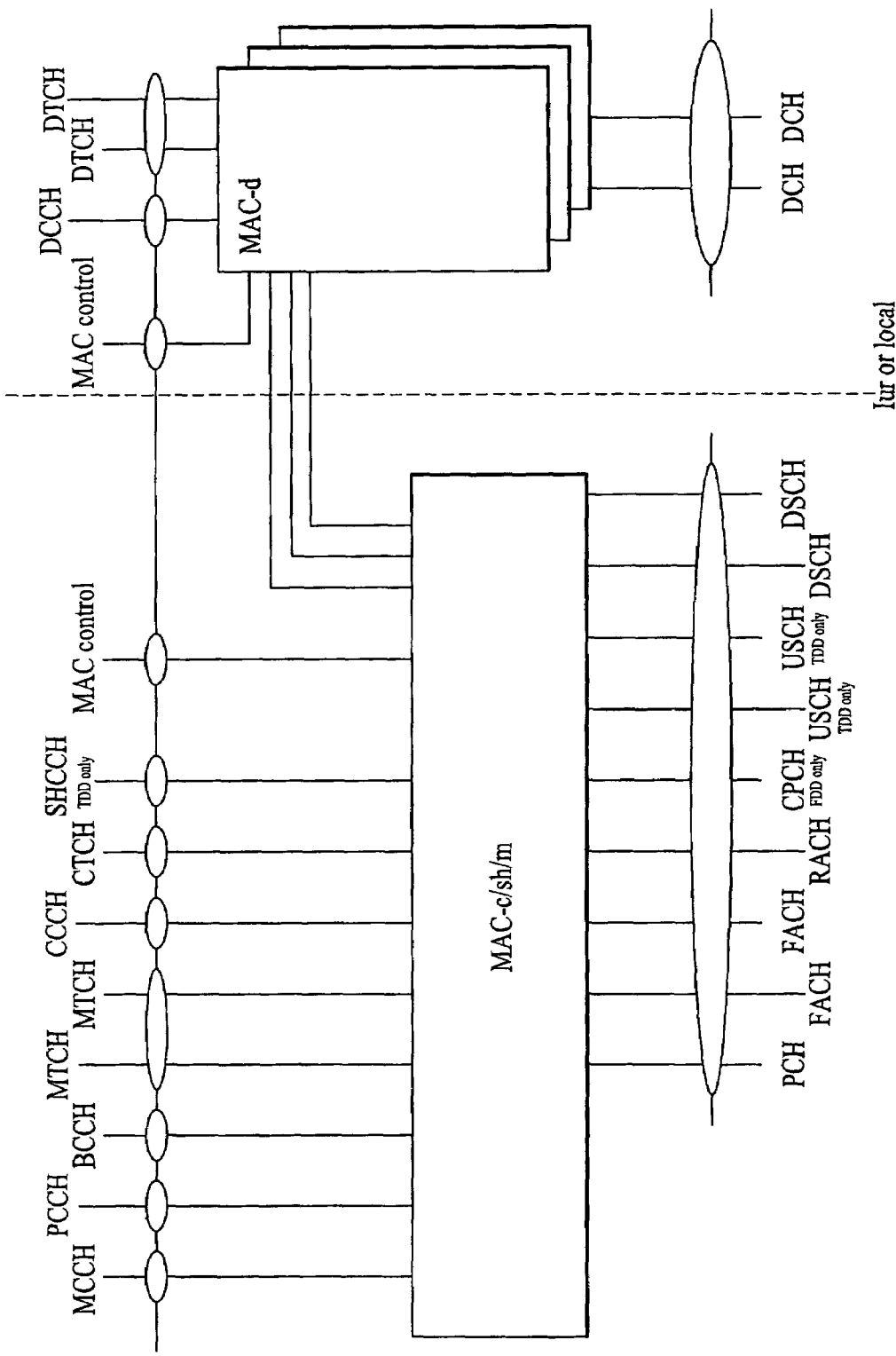
FIG. 3 illustrates a diagram of a conventional MAC architecture supporting MBMS based on 3GPP radio access network specifications.
Figure 4A:
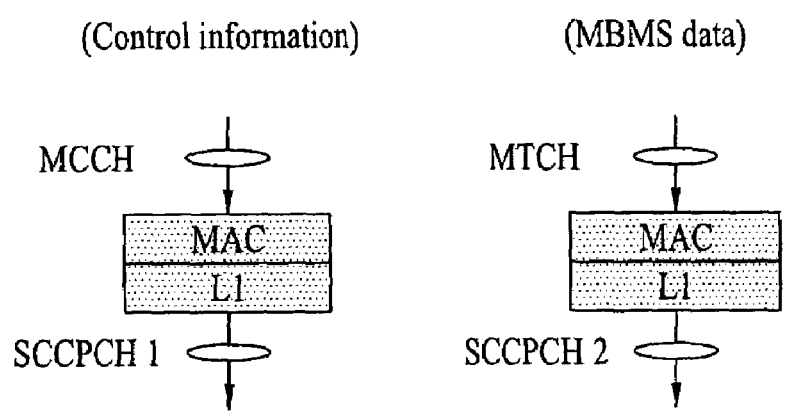
FIG. 4A illustrates a diagram of a conventional mapping structure of logical channels MTCH and MCCH.
Figure 4B:
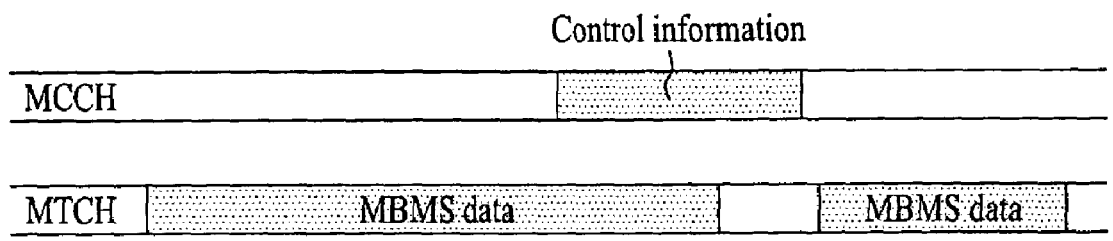
FIG. 4B illustrates a diagram of a conventional method of transmitting MBMS data and MBMS-associated control information.
Figure 5A:
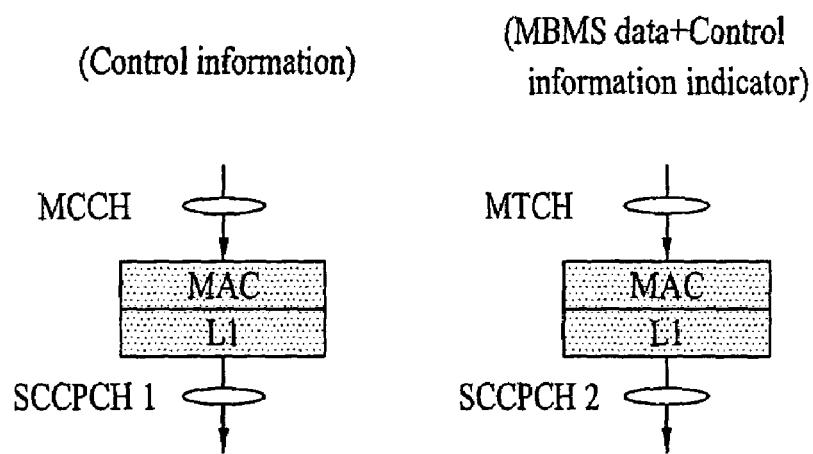
FIG. 5A illustrates a diagram of the transmission of MBMS data and control information indicator of a first physical channel and control information of a second physical channel according to a first embodiment of the present invention.
Figure 5B:
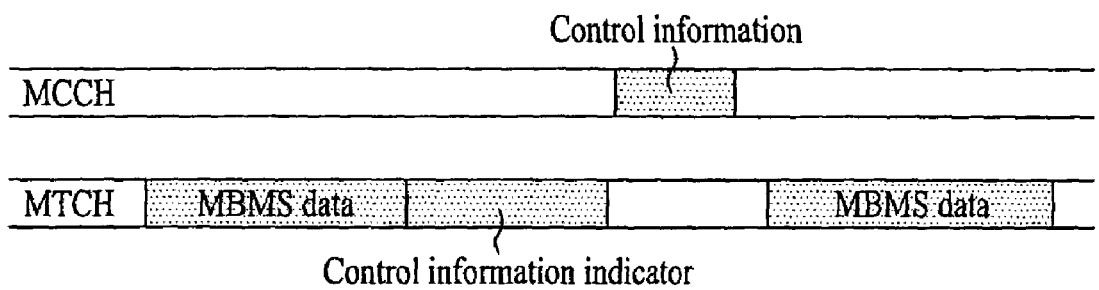
FIG. 5B illustrates where the logical channels MCCH and MTCH are each mapped to a unique physical channel according to a first embodiment of the present invention.

As illustrated in FIGS. 5A and 5B, a first embodiment according to the present invention proposes a method of transmitting and receiving control information associated with a specific service, for example a multimedia broadcast/multicast service (MBMS). The method utilizes an MTCH control information indicator transmitted to a mobile terminal 2, for example user equipment (UE), on the MTCH channel. The mapping is based on the conventional mapping structure illustrated in FIG. 4A, in which the logical channels MCCH and MTCH are each mapped to a unique physical channel, for example SCCPCH1 and SCCPCH2.

The control information indicator is transmitted over the MTCH channel so that UEs 2 unable to simultaneously receive the two physical channels can receive both the control information and the data. The control information indicator includes information about the transmission of the MBMS-associated control information, to thereby inform a participating ("joined") UE 2 that MBMS-associated control information will be transmitted via the MCCH channel. The control information indicator contains information concerning the content and transmission time of the MBMS-associated control information to be transmitted. The MBMS-associated control information is associated with the specific MBMS and/or another MBMS the UE 2 has joined.

According to the first embodiment of the present invention, the MTCH channel is utilized for transmitting the specific MBMS data and control information indicator to the UE 2, while the MCCH channel is utilized for transmitting the MBMS-associated control information. The respective transmissions may be non-concurrent.

FIG. 6 illustrates a method 50 for the transmitting and receiving MBMS-associated data and control information according to the first embodiment of the invention. The method 50 includes sequential steps S51 through S60. The UE 2 L1/L2 and UTRAN 6 L1/L2 layers each include a physical layer, a MAC layer, an RLC layer and a PDCP layer.

Specific MBMS data is transmitted from the UTRAN 6 L1/L2 layer to the UE 2 L1/L2 layer via a specific MTCH channel in step S51, the specific MTCH channel received by a participating UE. In step S52, the UTRAN 6 RRC layer generates and transfers a control information indicator to the UTRAN L1/L2 layer prior to transmitting MBMS-associated control information over the MCCH channel. In step S53, the UTRAN 6 L1/L2 layer transmits the control information indicator to the UE 2 L1/L2 layer via the same MTCH channel used for transmitting the MBMS data in step S51.

The UE 2 L1/L2 layer, having received the control information indicator, transfers the control information indicator to the UE RRC layer in step S54. The information included in the control information indicator is used to determine whether the UE 2 should receive the MBMS-associated control information.

If it is determined that the UE 2 is to receive the MBMS-associated control information, a first channel switching instruction from the UE RRC layer instructs the UE L1/L2 layer to switch the receiving channel to the MCCH channel in step S55. If it is determined that the UE 2 is not to receive the MBMS-associated control information, no instruction is issued and the UE 2 L1/L2 layer continues receiving the MTCH channel.

If the channel switching instruction was issued, the UE 2 L1/L2 layer switches the receiving physical channel from one physical channel to another in step S56, for example from a physical channel to which the MTCH channel is mapped to a physical channel to which the MCCH channel is mapped. Upon switching, the UE 2 RRC layer is enabled to receive the MBMS-associated control information transmitted from the UTRAN 6 RRC layer over the MCCH channel in step S57.

Upon completion of the reception of the MBMS-associated control information, a second channel switching instruction from the UE 2 RRC layer instructs the UE L1/L2 layer, in step S58, to switch the receiving physical channel back to the physical channel to which the MTCH channel is mapped. The UE 2 L1/L2 layer then performs a channel switching operation to switch the receiving channel back to the original physical channel in step S59, for example from the physical channel to which the MCCH channel is mapped to the physical channel to which the MTCH channel is mapped. After the channel switching operation, the UE 2 L1/L2 layer receives the MBMS data transmitted by the UTRAN 6 L1/L2 layer over the MTCH channel in step S60.

Second Embodiment

Figure 7A:
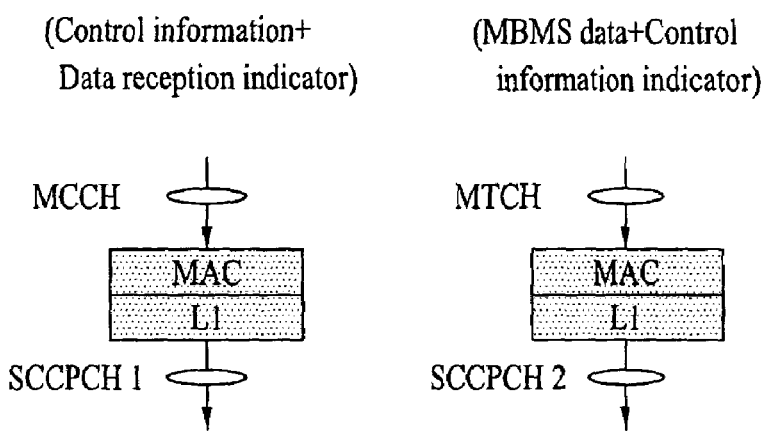
FIG. 7A illustrates a diagram of the transmission of MBMS data and control information indicator of a first physical channel and control information and data reception indicator of a second physical channel according to a second embodiment of the present invention.
Figure 7B:
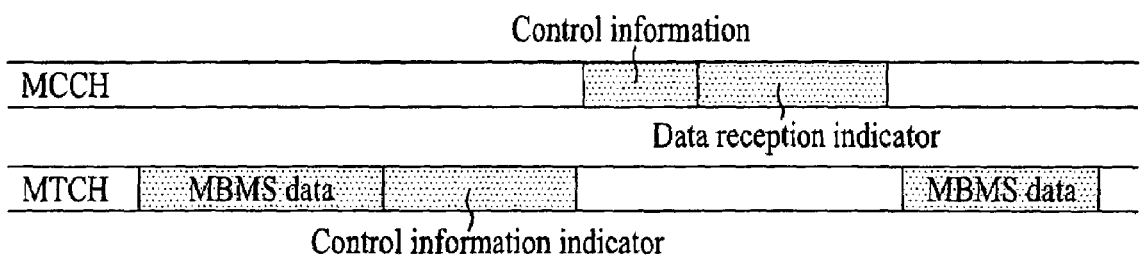
FIG. 7B illustrates where the logical channels MCCH and MTCH are each mapped to a unique physical channel according to a second embodiment of the present invention.

As illustrated in FIGS. 7A and 7B, a second embodiment according to the present invention proposes a method of transmitting and receiving control information associated with a specific service, for example a multimedia broadcast/multicast service (MBMS). The method utilizes a control information indicator transmitted on the MTCH channel and a data reception indicator transmitted on the MCCH channel. The mapping is based on the conventional mapping structure illustrated in FIG. 4A, in which the logical channels MCCH and MTCH are each mapped to a unique physical channel, for example SCCPCH1 and SCCPCH2.

The control information indicator is transmitted over the MTCH channel so that UEs 2 unable to simultaneously receive the two physical channels can receive both the control information and the data. The control information indicator includes information about the transmission of the MBMS-associated control information, to thereby inform a participating ("joined") UE 2 that MBMS-associated control information will be transmitted via the MCCH channel. The control information indicator contains information concerning the content and transmission time of the MBMS-associated control information to be transmitted. The MBMS-associated control information is associated with the specific MBMS and/or another MBMS the UE 2 has joined.

According to the second embodiment of the present invention, the MTCH channel is utilized for transmitting the specific MBMS data and control information indicator to the UE 2, while the MCCH channel is utilized for transmitting the MBMS-associated control information. The data reception indicator specifically instructs a UE 2 having received MBMS-associated control information to receive the MBMS data again and includes the content and transmission time information of the MBMS data to be transmitted via the MTCH channel. In contrast to the first embodiment, where the receiving channel spontaneously switches back to the MTCH channel after receipt of the MBMS-associated control information, the second embodiment proposes that the UE 2 switch to the MTCH channel upon the specific instruction of the data reception indicator.

FIG. 8 illustrates a method 100 for the transmitting and receiving MBMS-associated data and control information according to the second embodiment of the invention. The method 100 includes sequential steps S101 through S111. The UE 2 L1/L2 and UTRAN 6 L1/L2 layers each include a physical layer, a MAC layer, an RLC layer, and a PDCP layer.

Specific MBMS data is transmitted from the UTRAN 6 L1/L2 layer to the UE 2 L1/L2 layer via a specific MTCH channel in step S101, the specific MTCH channel received by a participating UE. In step S102, the UTRAN 6 RRC layer generates and transfers a control information indicator to the UTRAN L1/L2 layer prior to transmitting MBMS-associated control information over the MCCH channel. In step S103, the UTRAN 6 L1/L2 layer transmits the control information indicator to the UE 2 L1/L2 layer via the same MTCH channel used for transmitting the MBMS data in step S101.

The UE 2 L1/L2 layer, having received the control information indicator, transfers the control information indicator to the UE RRC layer in step S104. The information included in the control information indicator is used to determine whether the UE 2 should receive the MBMS-associated control information.

If it is determined that the UE 2 is to receive the MBMS-associated control information, a first channel switching instruction from the UE RRC layer instructs the UE L1/L2 layer to switch the receiving channel to the MCCH channel in step S105. If it is determined that the UE 2 is not to receive the MBMS-associated control information, no instruction is issued, and the UE L1/L2 layer continues receiving the MTCH channel.

If the channel switching instruction was issued, the UE 2 L1/L2 layer switches the receiving physical channel from one physical channel to another in step S106, for example from a physical channel to which the MTCH channel is mapped to a physical channel to which the MCCH channel is mapped. Upon switching, the UE 2 RRC layer is enabled to receive the MBMS-associated control information transmitted from the UTRAN 6 RRC layer over the MCCH channel in step S107.

Upon completion of the transmission of the MBMS-associated control information, the UTRAN 6 RRC layer transmits the data reception indicator to the UE 2 in step S108, thereby instructing the UE RRC layer to receive the MBMS data. In response, a second channel switching instruction from the UE 2 RRC layer instructs the UE L1/L2 layer, in step S109, to switch the receiving physical channel back to the physical channel to which the MTCH channel is mapped. The UE 2 L1/L2 layer then performs a channel switching operation to switch the receiving channel back to the original physical channel in step S110, for example from the physical channel to which the MCCH channel is mapped to the physical channel to which the MTCH channel is mapped. After the channel switching operation, the UE 2 L1/L2 layer receives the MBMS data transmitted by the UTRAN 6 L1/L2 layer over the MTCH channel in step S111.

Third Embodiment

Figure 9A:
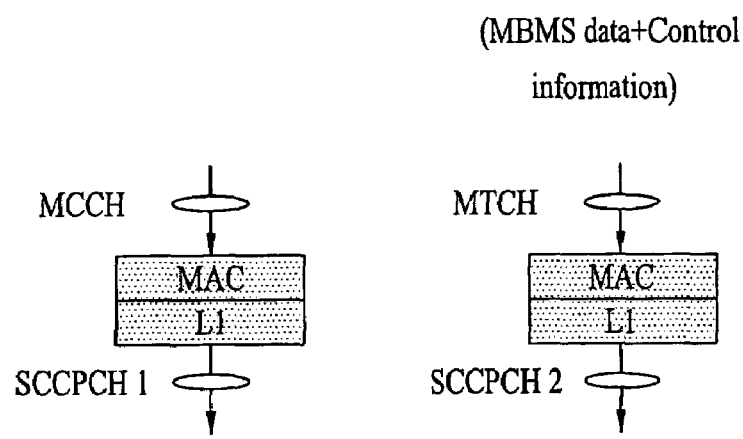
FIG. 9A illustrates a diagram of the transmission of MBMS data and control information according to a third embodiment of the present invention.
Figure 9B:
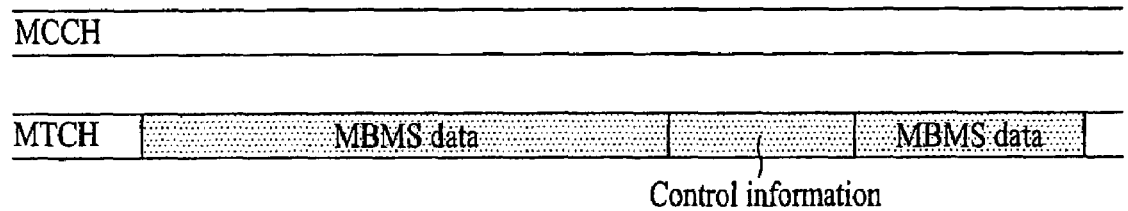
FIG. 9B illustrates where the logical channels MCCH and MTCH are each mapped to a unique physical channel in a third embodiment of the present invention

As illustrated in FIGS. 9A and 9B, a third embodiment according to the present invention proposes a method of transmitting and receiving control information associated with a specific service, for example a multimedia broadcast/multicast service (MBMS). The method utilizes MBMS-associated control information transmitted on the MTCH channel together with the MBMS data. The mapping is based on the conventional mapping structure illustrated in FIG. 4A, in which the logical channels MCCH and MTCH are each mapped to a unique physical channel, for example SCCPCH1 and SCCPCH2.

The MTCH channel is utilized for transmitting both the specific MBMS data and MBMS-associated control information to the UE 2. In contrast to the first and second embodiments, where the MBMS-associated control information is transmitted and received via the MCCH channel, the third embodiment proposes that the MBMS-associated control information be transmitted and received via the same MTCH channel carrying the MBMS data.

Figure 10:
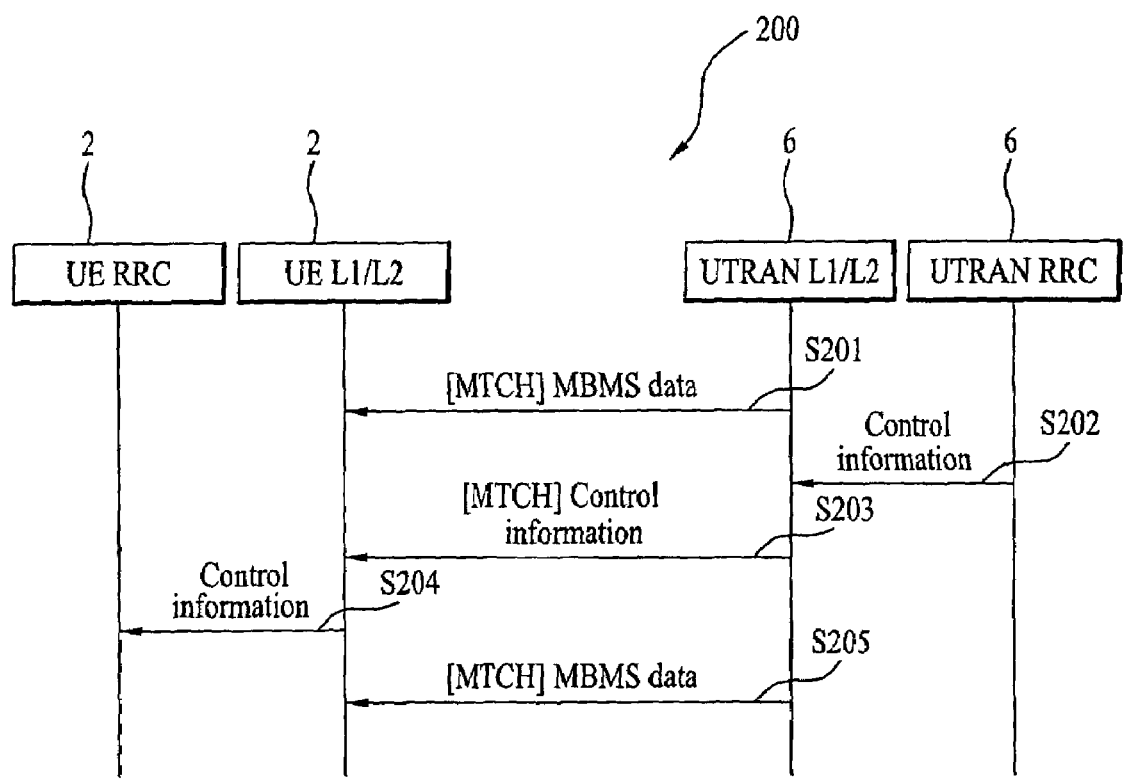
FIG. 10 illustrates a method for transmitting and receiving MBMS-associated data and control information according to FIG. 9.

FIG. 10 illustrates a method 200 for the transmitting and receiving MBMS-associated data and control information according to the third embodiment of the invention. The method 100 includes sequential steps S201 through S205. The UE 2 L1/L2 and UTRAN 6 L1/L2 layers each include a physical layer, a MAC layer, an RLC layer, and a PDCP layer.

Specific MBMS data is transmitted from the UTRAN 6 L1/L2 layer to the UE 2 L1/L2 layer via a specific MTCH channel in step S201, the specific MTCH channel received by a participating UE. If, during the course of MBMS data transmission, MBMS-associated control information needs to be transmitted to the UE 2, the UTRAN 6 RRC layer transfers the control information to the UTRAN L1/L2 layer in step S202. The UTRAN 6 L1/L2 layer in turn transmits the control information to the UE 2 L1/L2 layer in step S203, via the same MTCH channel.

The MBMS-associated control information is transmitted from the UTRAN 6 L1/L2 layer to the UE 2 L1/L2 layer using a control protocol data unit (control PDU) of a user plane. The UTRAN 6 L1/L2 layer configures a control PDU to include the MBMS-associated control information. The control PDU is transferred to the UE 2 L1/L2 layer using the user plane protocol, where it is disassembled to acquire the included control information.

The user plane configuring or disassembling the control PDU may be the PDCP, RLC, or MAC layer or may be an L2 sublayer higher than the PDCP layer. In step S204, the UE 2 L1/L2 transfers the received MBMS-associated control information to the UE RRC layer. Upon successful transmission of the control information, the UTRAN 6 L1/L2 layer transmits the MBMS data over the MTCH channel for reception by the UE 2 L1/L2 layer in step S205.

Fourth Embodiment

Figure 11A:
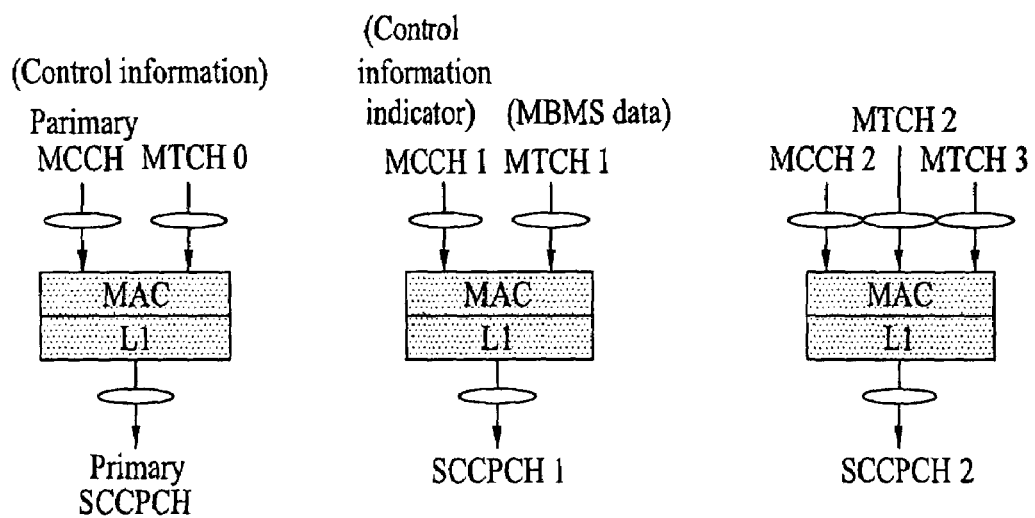
FIG. 11A illustrates a diagram of a mapping structure of logical channels MTCH and MCCH according to a fourth embodiment of the present invention.
Figure 11B:
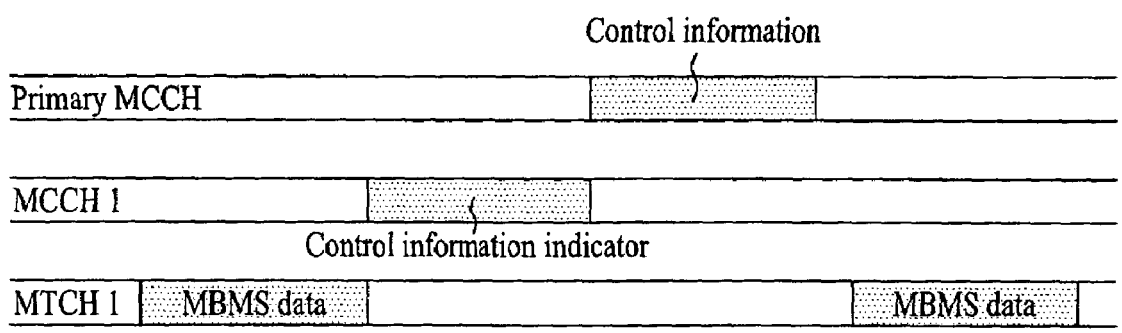
FIG. 11B illustrates a diagram of the transmission of MBMS data and control information according to the mapping structure of FIG. 11A.

As illustrated in FIGS. 11A and 11B, a fourth embodiment according to the present invention proposes a method of transmitting and receiving control information associated with a specific service, for example a multimedia broadcast/multicast service (MBMS). The method utilizes a control information indicator transmitted via an MCCH channel, with the MCCH channel mapped together with the MTCH channel to the same physical channel.

Specifically, FIG. 11A illustrates the MTCH channel mapped to a primary SCCPCH channel to which the primary MCCH channel is mapped and FIG. 11B illustrates the MBMS-associated control information transmitted via the primary MCCH channel, the control information indicator transmitted via the MCCH 1 channel and the MBMS data transmitted via the MTCH channel. The control information indicator informs the UE 2 that the control information is to be transmitted via the primary MCCH channel.

Referring to FIG. 11A, at least one MTCH and one MCCH channel are mapped to a physical channel, with one specific MCCH channel set as a primary MCCH channel for a corresponding cell. MBMS-associated control information for a specific MBMS is transmitted via the primary MCCH channel, with the primary MCCH channel and the MTCH channel on which the MBMS data for the specific MBMS is transmitted mapped to unique physical channels. For example, the primary MCCH channel may be mapped to a primary physical channel such as SCCPCH and the MTCH channel on which the MBMS data is transmitted may be mapped to a second physical channel such as SCCPCH 1.

A control information indicator for notifying the UE 2 of the transmission of the MBMS-associated control information is transmitted via an MCCH channel mapped to the same physical channel to which the MTCH channel that transmits the MBMS data is mapped. For example, the control information indicator for the specific MBMS may be transmitted on MCCH 1 and the MBMS data for the specific MBMS transmitted on MTCH 1, with MCCH 1 and MTCH 1 both mapped to SCCPCH 1. By mapping MCCH 1 and MTCH 1 to the same physical channel, SCCPCH 1, that is unique from the physical channel, SCCPCH, to which the primary MCCH channel is mapped, the control information indicator may be successfully transmitted in advance of the transmission of the MBMS-associated control information via the primary MCCH channel.

All the MCCH channels, other than the primary MCCH channel in a specific cell, are set up such that one MCCH channel exists for each specific MBMS service and for each MTCH channel, or for each physical channel to which at least one MTCH channel is mapped. An MTCH channel may be mapped to the physical channel to which the primary MCCH channel is mapped.

Figure 12:
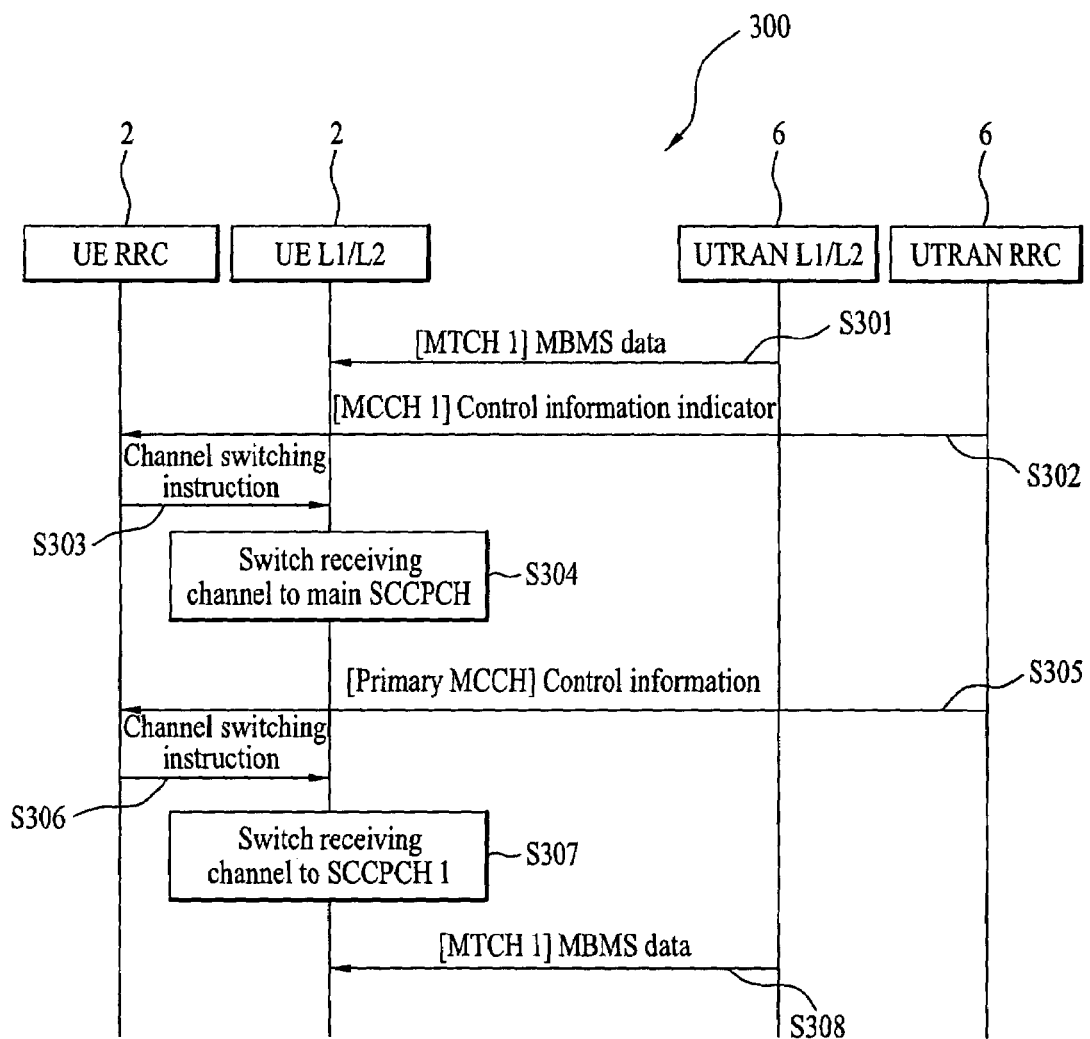
FIG. 12 illustrates a method for transmitting and receiving MBMS-associated data and control information according to FIGS. 11A and 11B.

FIG. 12 illustrates a method 300 for the transmitting and receiving MBMS-associated data and control information according to the fourth embodiment of the invention. The method 300 includes sequential steps S301 through S308. The UE 2 L1/L2 and UTRAN 6 L1/L2 layers each include a physical layer, a MAC layer, an RLC layer, and a PDCP layer.

Specific MBMS data is transmitted from the UTRAN 6 L1/L2 layer to the UE 2 L1/L2 layer in step S301. The MBMS data is transmitted via a specific MTCH channel, for example MTCH 1, with the specific MTCH channel received by a participating UE.

In step S302, the UTRAN 6 RRC layer generates and transmits a control information indicator to the UE 2 RRC layer via the MCCH channel prior to transmitting the MBMS-associated control information via the primary MCCH channel. Specifically, the control information indicator may be transmitted on the MCCH 1 channel, which is mapped to a physical channel, for example SCCPCH 1, on which the MTCH 1 channel is established. The information in the control information indicator is used to determine whether the UE 2 should receive MBMS-associated control information.

If it is determined the UE 2 is to receive the MBMS-associated control information, a first channel switching instruction from the UE RRC layer instructs the UE L1/L2 layer to switch the receiving channel, in step S303, to the physical channel, for example primary SCCPCH, to which the primary MCCH channel is mapped. If it is determined that the UE 2 is not to receive the MBMS-associated control information, no instruction is issued, and the UE L1/L2 layer continues receiving the MTCH 1 channel mapped to physical channel SCCPCH 1.

If the channel switching instruction was issued, the UE L1/L2 layer switches the receiving physical channel, in step S304, to the physical channel, for example primary SCCPCH, on which the primary MCCH channel is mapped. Upon switching, the UE 2 RRC layer is enabled to receive the MBMS-associated control information transmitted from the UTRAN 6 RRC layer over the MCCH channel in step S305.

Upon completion of the transmission of the MBMS-associated control information, a second channel switching instruction from the UE 2 RRC layer instructs the UE L1/L2 layer to switch the receiving physical channel back to the SCCPCH 1 channel in step S306. The UE 2 L1/L2 layer then performs a channel switching operation to switch the receiving channel back to the original physical channel in step S307, for example from the primary SCCPCH physical channel to which the primary MCCH channel is mapped to the SCCPCH 1 physical channel to which the MTCH 1 channel is mapped. After the channel switching operation, the UE 2 L1/L2 layer receives the MBMS data transmitted by the UTRAN 6 L1/L2 layer over the MTCH 1 channel in step S308.

Fifth Embodiment

Figure 13A:
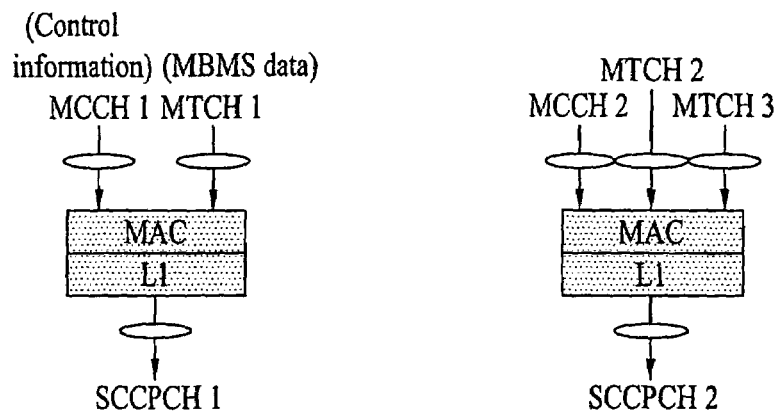
FIG. 13A illustrates a diagram of a mapping structure of logical channels MTCH and MCCH according to a fifth embodiment of the present invention.
Figure 13B:
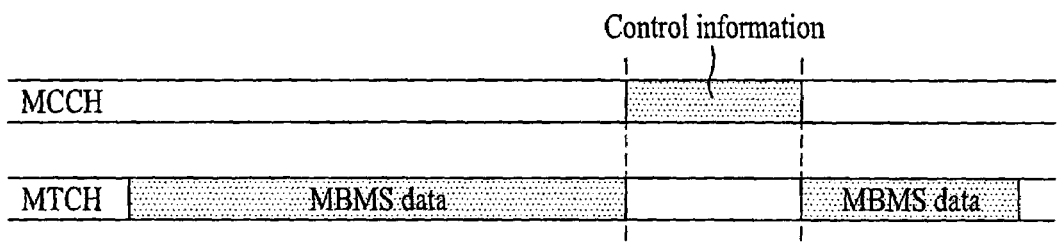
FIG. 13B illustrates a diagram of the transmission of MBMS data and control information according to the mapping structure of FIG. 13A.

As illustrated in FIGS. 13A and 13B, a fifth embodiment according to the present invention proposes a method of transmitting and receiving control information associated with a specific service, for example a multimedia broadcast/multicast service (MBMS). The method utilizes MBMS-associated control information transmitted via an MCCH channel, with the MTCH channel mapped together with the MTCH channel to the same physical channel.

In the fifth embodiment, as in the fourth embodiment, at least one MTCH and one MCCH channel are mapped to a physical channel, with one specific MCCH channel set as a primary MCCH channel for a corresponding cell. Unlike the fourth embodiment, the MBMS data is transmitted via an MTCH channel that is mapped to the same physical channel to which the MCCH channel transmitting the MBMS-associated control information is mapped.

Upon establishing the MTCH channel for transmitting the MBMS data, the MBMS-associated control information is transmitted via an MCCH channel mapped to the same physical channel to which the MTCH channel for transmitting the MBMS data is mapped. An MCCH channel is established for every physical channel for which an MTCH channel is established.

MCCH channels for transmitting the MBMS-associated control information are established such that one MCCH channel exists for each specific MBMS and for each MTCH channel, or for each physical channel to which at least one MTCH channel is mapped. The MBMS-associated control information for a specific MBMS is transmitted via an MCCH channel, for example MCCH 1, and the MBMS data for the specific MBMS is transmitted via an MTCH channel, for example MTCH 1, where MCCH 1 is mapped together with MTCH 1 to the same physical channel, for example SCCPCH 1.

Figure 14:
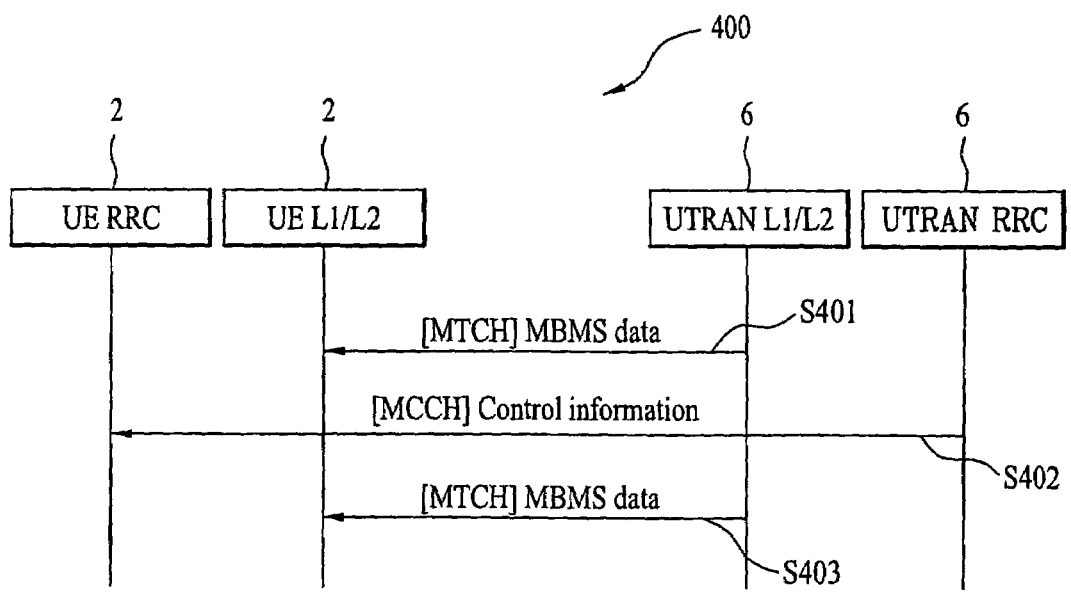
FIG. 14 illustrates a method for transmitting and receiving MBMS-associated data and control information according to FIGS. 13A and 13B.

FIG. 14 illustrates a method 400 for the transmitting and receiving MBMS-associated data and control information according to the fifth embodiment of the invention. The method 300 includes sequential steps S401 through S403. The UE 2 L1/L2 and UTRAN 6 L1/L2 layers each include a physical layer, a MAC layer, an RLC layer, and a PDCP layer.

Specific MBMS data is transmitted from the UTRAN 6 L1/L2 layer to the UE 2 L1/L2 layer via a specific MTCH channel in step S401, the specific MTCH channel received by a participating UE. If, during MBMS data transmission, MBMS-associated control information needs to be transmitted to the UE 2, the UTRAN 6 RRC layer transmits the MBMS-associated control information to the UE RRC layer in step S402 via the MCCH channel mapped to a physical channel together with the MTCH channel. Therefore, the UE 2 needs no channel switching to receive the MBMS-associated control information. Upon completion of the control information transmission, the UTRAN 6 L1/L2 layer transmits the MBMS data to the UE2 L1/L2 layer via the MTCH channel in step S403.

It is preferable that the participating UE 2 first receive information for establishing the MTCH and MCCH channels utilized for receiving the MBMS service via the primary MCCH channel and then receive the MBMS data and the MBMS-associated control information via the established MTCH and MCCH channels. More preferably, the MTCH and MCCH channels are mapped to the same physical channel to reduce the number of physical channels simultaneously received by the UE 2. The MTCH channel may be mapped to the physical channel to which the primary MCCH channel is mapped.

Figure 15A:
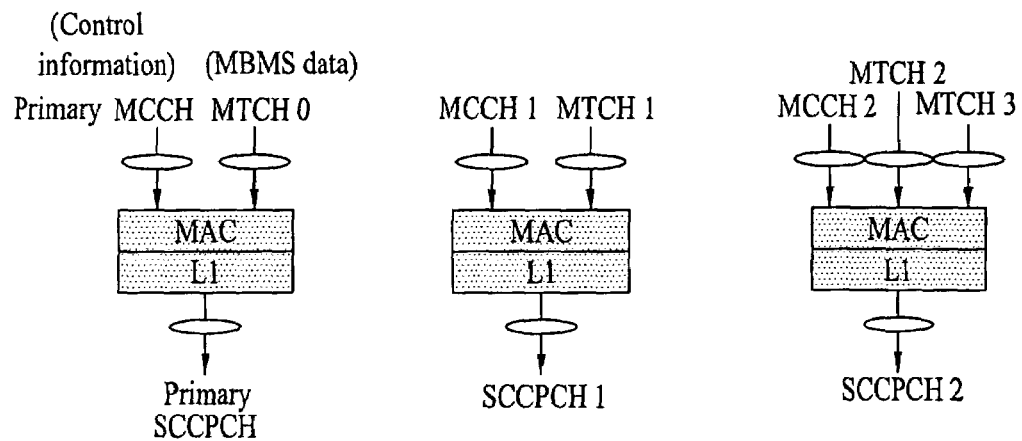
FIG. 15A illustrates a diagram of a structure for mapping additional logical channels MTCH and MCCH according to the fifth embodiment of the present invention.

As illustrated in FIG. 15A, when the MTCH channel is mapped to the physical channel to which the primary MCCH channel is mapped, for example primary SCCPCH, UEs 2 receiving the MTCH channels, and specifically the MTCH 0 channel, receive the MBMS-associated control information via the primary MCCH channel. Excluding the primary MCCH channel, all other MCCH channels transmit the MBMS-associated control information for the MTCH channels to which they are mapped.

Figure 15B:
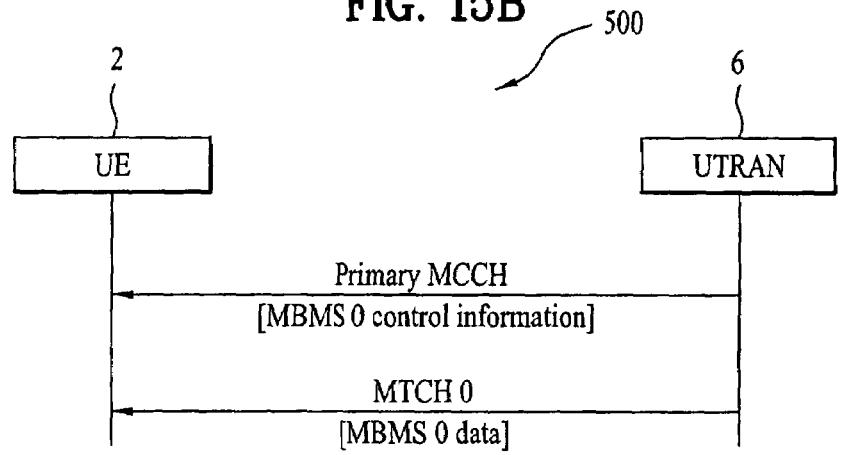
FIGS. 15B and 15C illustrate a method for transmitting and receiving MBMS-associated data and control information for a service MBMS 0 and a service MBMS 1 according to the mapping structure of FIG. 15A.
Figure 15C:
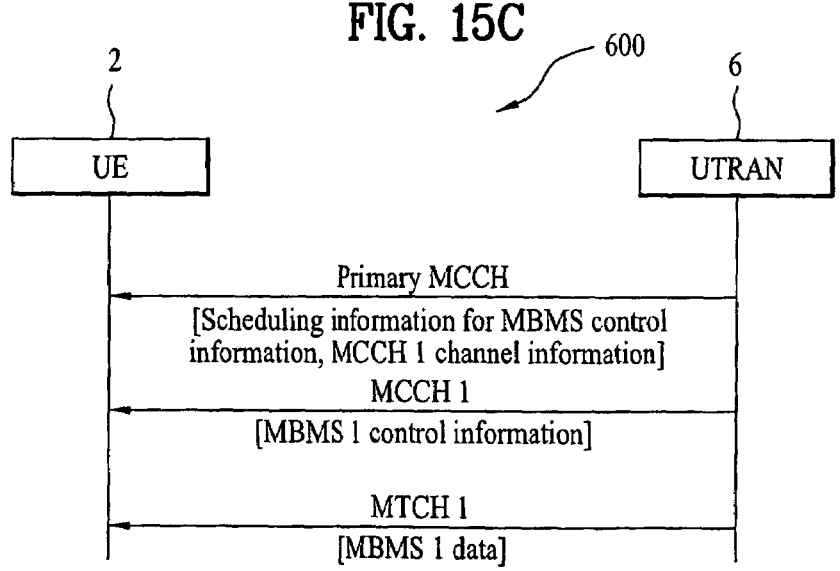

FIGS. 15B and 15C illustrate methods 500, 600 for transmitting specific MBMS-associated control information via the MCCH channel mapped to the SCCPCH channel of FIG. 15A. FIG. 15B illustrates the transmission of the control information and data for MBMS 0 and FIG. 15C illustrates the transmission of the control information and data for MBMS 1.

As illustrated in FIG. 15B, a UTRAN 6 enables the transmission of MBMS-associated control information via the primary MCCH channel prior to establishment of the MTCH 0 channel for transmitting MBMS 0 data. Upon establishing the MTCH 0 channel, the UE 2 receives MBMS 0 data via the MTCH 0 channel and receives the associated control information via the primary MCCH channel established on the same physical channel as the MTCH 0 channel.

As illustrated in FIG. 15C, a UTRAN 6 enables the transmission of MBMS-associated control information via the primary MCCH channel prior to establishment of the MTCH 1 channel for transmitting the MBMS 1 data. The UE 2 acquires the information necessary for establishing the MCCH 1 channel via the primary MCCH channel and can acquire the information necessary for establishing the MTCH 1 channel via the MCCH 1 or primary MCCH channel. Upon establishing the MCCH 1 and MTCH 1 channels, the UE 2 receives the MBMS 1 data via the MTCH 1 channel and receives the MBMS 1-associated control information via the MCCH 1 channel established on the same physical channel as MTCH 1.

FIGS. 16A and 16B illustrate methods 700, 800 for establishing the MCCH channel on a UE 2 in accordance with the fifth embodiment of the invention. As illustrated in FIG. 16A, the UE 2 acquires the information necessary for establishing the primary MCCH channel via a broadcast control channel such as BCH, a paging channel such as PCH or a page indicator channel such as PICH and then establishes the primary MCCH channel. A participating UE 2 acquires the necessary information for establishing an MTCH channel to receive a packet data service, for example an MBMS, via the primary MCCH channel since the MCCH channel is mapped together with the MTCH channel to the same physical channel.

The UE 2 then establishes MTCH and MCCH logical channels using the channel information of the logical channels mapped to the same physical channel. The UE 2 receives the data of the packet data service via the MTCH channel and receives the service-associated control information via the MCCH channel.

As illustrated in FIG. 16B, the UE 2 establishes the primary MCCH channel by acquiring primary MCCH channel information via the BCH, PCH, or PICH channel. In order to establish the MCCH channel, a participating UE 2 acquires the MCCH channel information of a packet data service, for example an MBMS, via the primary MCCH channel. The UE 2 then receives the data of the packet data service via the established MCCH channel. The UE 2 then receives the data of the corresponding service via the MTCH channel.

Figure 17:
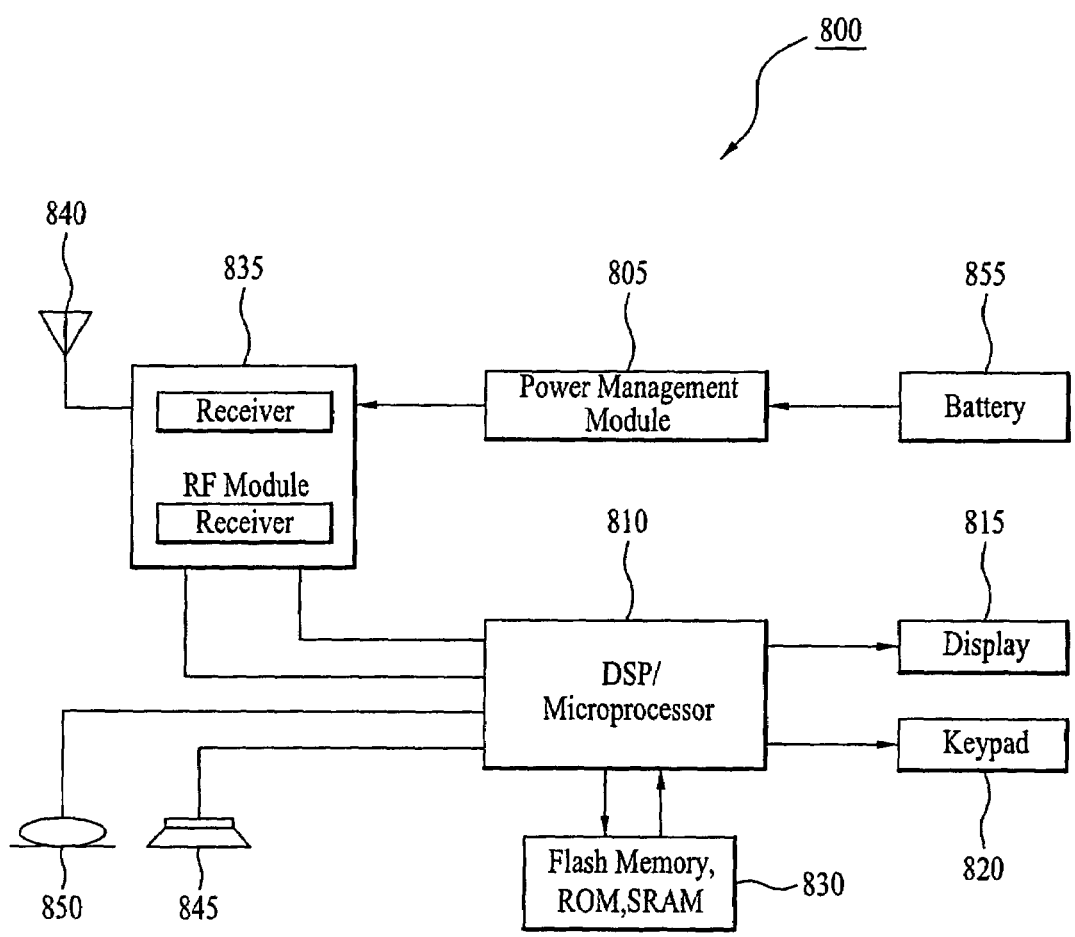
FIG. 17 illustrates a network for transmitting a service to a mobile terminal according to one embodiment of the present invention.

Referring to FIG. 17, a block diagram of a mobile communication device 800 of the present invention is illustrated, for example a mobile phone for performing the methods of the present invention. The mobile communication device 800 includes a processing unit 810 such as a microprocessor or digital signal processor, an RF module 835, a power management module 805, an antenna 840, a battery 855, a display 815, a keypad 820, a storage unit 830 such as flash memory, ROM or SRAM, a speaker 845 and a microphone 850.

A user enters instructional information, such as a telephone number, for example, by pushing the buttons of the keypad 820 or by voice activation using the microphone 850. The processing unit 810 receives and processes the instructional information to perform the appropriate function, such as to dial the telephone number. Operational data may be retrieved from the storage unit 830 to perform the function. Furthermore, the processing unit 810 may display the instructional and operational information on the display 815 for the user's reference and convenience.

The processing unit 810 issues instructional information to the RF section 835, to initiate communication, for example, by transmitting radio signals comprising voice communication data. The RF module 835 includes a receiver and a transmitter to receive and transmit radio signals. The antenna 840 facilitates the transmission and reception of radio signals. Upon receiving radio signals, the RF module 835 may forward and convert the signals to baseband frequency for processing by the processing unit 810. The processed signals may be transformed into audible or readable information output, for example, via the speaker 845.

In one embodiment of the mobile communication device 800, the RF module 835 is adapted to receive data and a control information indicator via a first channel and to receive control information via a second channel, the storage unit 830 is adapted to store the data and the control information, and the processing unit 810 is adapted to process service-associated data and the control information indicator received on the first channel in order to receive service-associated control information on the second channel.

In another embodiment of the mobile communication device 800, the RF module 835 is adapted to receive first control information on a first point-to-multipoint channel associated with the service and to receive data and second control information on a second point-to-multipoint channel associated with the service, the storage unit 830 is adapted to store the first control information, the data and the second control information, and the processing unit 810 is adapted to process the first control information and establish the second point-to-multipoint channel in order to receive and process the data and second control information.

It will be apparent to one skilled in the art that the mobile communication device 800 may be readily implemented using, for example, the processing unit 810 or other data or digital processing device, either alone or in combination with external support logic.

Figure 18:
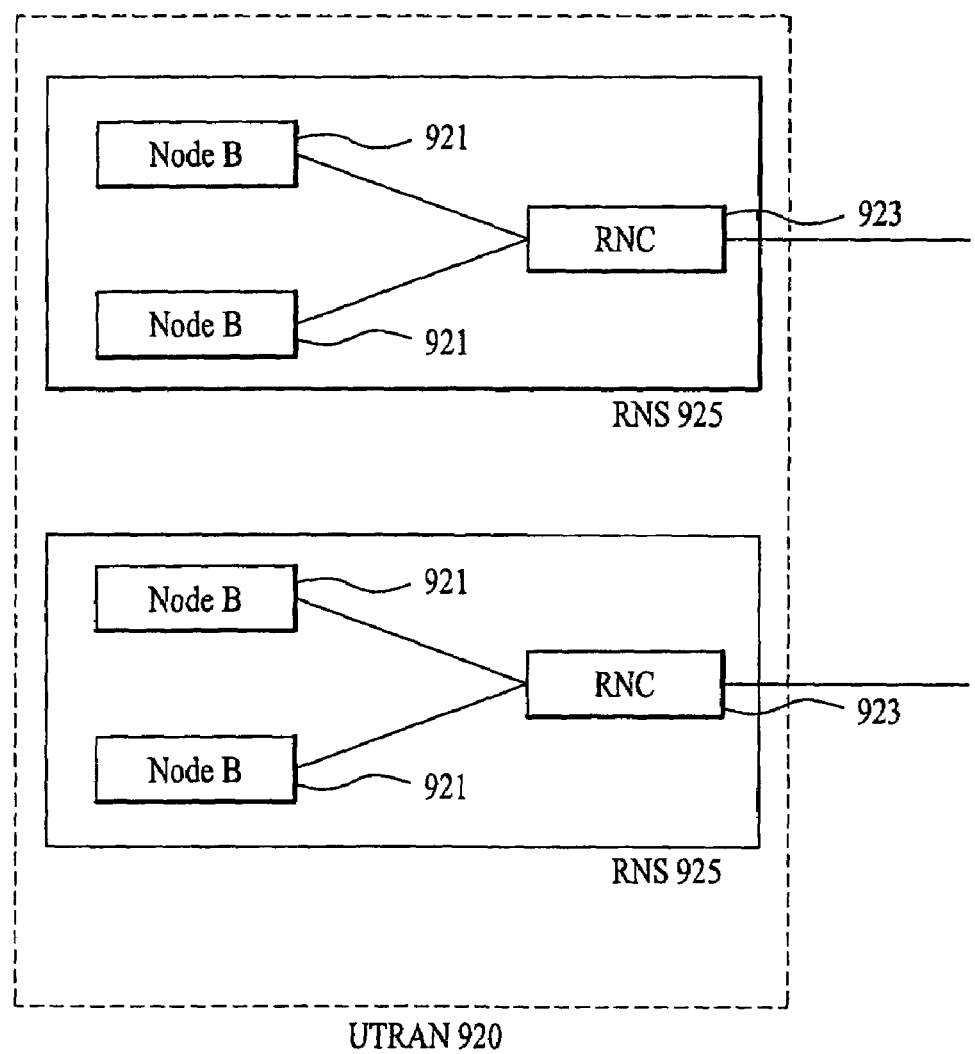
FIG. 18 illustrates a mobile communication device for receiving a service from a network according to one embodiment of the present invention.

FIG. 18 illustrates a block diagram of a UTRAN 920 according to one embodiment of the present invention. The UTRAN 920 includes one or more radio network sub-systems (RNS) 925. Each RNS 925 includes a radio network controller (RNC) 923 and a plurality of Node-Bs 921, or base stations, managed by the RNC. The RNC 923 handles the assignment and management of radio resources and operates as an access point with respect to the core network 4. Furthermore, the RNC 923 is adapted to perform the methods of the present invention.

The Node-Bs 921 receive information sent by the physical layer of a mobile terminal 800 through an uplink and transmit data to the mobile terminal through a downlink. The Node-Bs 921 operate as access points, or as a transmitter and receiver, of the UTRAN 920 for the terminal 800.

In one embodiment of the UTRAN 920, the Node-Bs 921 are adapted to transmit data and a control information indicator to the mobile terminal 800 via a first channel and to transmit control information to the mobile terminal via a second channel, and the RNC 923 is adapted to provide, on the first channel, service-associated data and a control information indicator indicating transmission of control information on the second channel, and to provide control information associated with the service and/or another service on the second channel. In another embodiment of the UTRAN 920, the Node-Bs 921 are adapted to transmit first control information to the mobile terminal 800 via a first point-to-multipoint channel and to transmit data and second control information to the mobile terminal via a second point-to-multipoint channel, and the RNC 923 is adapted to provide the first control information on the first point-to-multipoint channel and to provide the data and second control information on the second point-to-multipoint channel after the second point-to-multipoint channel is established by the mobile terminal.

As described above, when transmitting service-associated control information via a first logical channel, such as MCCH, a mobile terminal is informed via a first physical channel to which a second logical channel carrying service-associated data, such as MTCH, is mapped that the service-associated control information will be transmitted on a second physical channel, or the service-associated control information is transmitted to the mobile terminal via the same physical channel to which the second logical channel carrying service-associated data is mapped. The mobile terminal need not simultaneously receive two physical channels in order to receive MBMS data and MBMS control information.

In a UMTS system providing MBMS services, any physical channel transmitting specific MBMS-associated data may also transmit the necessary specific MBMS-associated control information, thereby minimizing the number of physical channels a UE is required to simultaneously receive. Minimizing the number of physical channels reduces the need for an enhanced capability, higher cost UE that can simultaneously receive multiple physical channels in order to receive additional services in addition to the specific MBMS.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

What is claimed is:

1. A method of receiving a service in a mobile terminal, the method comprising:

receiving data for the service and a control information indicator via a first physical channel to which first and second logical channels are mapped, the control information indicator indicating transmission of control information on a second physical channel and including information about content and transmission time of the control information to be transmitted on the second physical channel, wherein the data for the service is mapped to the first logical channel and the control information indicator is mapped to the second logical channel;

switching from the first physical channel to the second physical channel upon receiving the control information indicator in order to receive the control information on the second physical channel;

receiving the control information via the second physical channel according to the information about the content and the transmission time included in the control information indicator and the control information is necessary for receiving the data for the service, wherein the second physical channel is mapped to a third logical channel;

receiving a data reception indicator on the second physical channel, the data reception indicator indicating the transmission of data for the service on the first physical channel and including information about content and transmission time of the data for the service to be transmitted on the first physical channel;

switching from the second physical channel to the first physical channel upon receiving the data reception indicator in order to receive the data for the service on the first physical channel; and receiving the data for the service on the first physical channel based on the control information and the information about the content and the transmission time included in the data reception indicator.

2. The method of claim 1, wherein the service is a point-to-multipoint service.

3. The method of claim 1, wherein the data is point-to-multipoint data and the control information is point-to-multipoint control information.

4. The method of claim 1, wherein the data and control information are not received simultaneously.

5. The method of claim 1, wherein the first logical channel is MTCH, the second logical channel is a second MCCH channel and the third logical channel is a primary MCCH channel.

6. The method of claim 1, wherein the data and control information are not received simultaneously.

7. A method of providing a service to a mobile terminal, the method comprising:

transmitting data for the service and a control information indicator via a first physical channel to which first and second logical channels are mapped, the control information indicator indicating transmission of control information on a second physical channel and including information about content and transmission time of the control information to be transmitted on the second physical channel, wherein the data for the service is mapped to the first logical channel and the control information indicator is mapped to the second logical channel;

transmitting the control information via the second physical channel according to the information about the content and the transmission time included in the control information indicator, wherein the control information is necessary for transmitting the data for the service and the second physical channel is mapped to a third logical channel;

transmitting a data reception indicator on the second physical channel, the data reception indicator indicating the transmission of data for the service on the first physical channel and including information about content and transmission time of the data for the service to be transmitted on the first physical channel; and transmitting the data for the service on the first physical channel based on the control information and the information about the content and the transmission time included in the data reception indicator.

8. The method of claim 7, wherein the service is a point-to-multipoint service.

9. The method of claim 7, wherein the data is point-to-multipoint data and the control information is point-to-multipoint control information.

10. The method of claim 7, wherein the data and control information are not transmitted simultaneously.

11. The method of claim 7, wherein the first logical channel is MTCH, the second logical channel is a second MCCH channel and the third logical channel is a primary MCCH channel.

* * * * *